(12) United States Patent
Sparacin et al.

(10) Patent No.: US 7,831,123 B2
(45) Date of Patent: Nov. 9, 2010

(54) MICROPHOTONIC WAVEGUIDE INCLUDING CORE/CLADDING INTERFACE LAYER

(75) Inventors: Daniel K. Sparacin, Washington, DC (US); Anuradha M. Agarwal, Weston, MA (US); Pradip K. Roy, Orlando, FL (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/899,234

(22) Filed: Sep. 5, 2007

(65) Prior Publication Data

US 2008/0253728 A1   Oct. 16, 2008

Related U.S. Application Data

(60) Provisional application No. 60/842,715, filed on Sep. 7, 2006.

(51) Int. Cl.
  *G02B 6/10* (2006.01)
(52) U.S. Cl. ............... 385/131; 385/129; 385/130; 385/132
(58) Field of Classification Search ............... 385/132
  See application file for complete search history.

(56) References Cited

U.S. PATENT DOCUMENTS

| | | | |
|---|---|---|---|
| 5,562,838 A * | 10/1996 | Wojnarowski et al. | 216/24 |
| 6,487,354 B1 * | 11/2002 | Ferm et al. | 385/129 |
| 6,775,453 B1 * | 8/2004 | Hornbeck et al. | 385/129 |
| 7,289,712 B2 * | 10/2007 | Kim et al. | 385/132 |
| 2001/0041027 A1 | 11/2001 | Hornbeck et al. | |
| 2002/0021879 A1 * | 2/2002 | Lee et al. | 385/129 |
| 2004/0109659 A1 | 6/2004 | Aylward et al. | |
| 2007/0147762 A1 * | 6/2007 | Kwakernaak et al. | 385/131 |

FOREIGN PATENT DOCUMENTS

| | | |
|---|---|---|
| EP | 0819956 | 1/1998 |
| JP | 08304644 | 11/1996 |
| WO | WO 03/060569 | 7/2003 |

(Continued)

OTHER PUBLICATIONS

WO 2008/030468 A3 International Search Report for PCT/US2007/019356, Mar. 13, 2008.

(Continued)

*Primary Examiner*—Michelle R Connelly Cushwa
(74) *Attorney, Agent, or Firm*—Theresa A. Lober

(57) ABSTRACT

The invention provides a waveguide with a waveguide core having longitudinal sidewall surfaces, a longitudinal top surface, and a longitudinal bottom surface that is disposed on a substrate. An interface layer is disposed on at least one longitudinal sidewall surface of the waveguide core. A waveguide cladding layer is disposed on at least the waveguide core sidewall and top surfaces, over the interface layer. The waveguide of the invention can be produced by forming a waveguide undercladding layer on a substrate, and then forming a waveguide core on the undercladding layer. An interface layer is then formed on at least a longitudinal sidewall surface of the waveguide core, and an upper cladding layer is formed on a longitudinal top surface and on longitudinal sidewall surfaces of the waveguide core, over the interface layer.

18 Claims, 7 Drawing Sheets

FOREIGN PATENT DOCUMENTS

WO     WO 03/060569 A2 *   7/2003

OTHER PUBLICATIONS

International Preliminary Report on Patentability for PCT/US2007/019356, Mar. 19, 2009.

Sparacin et al., "Low Loss Amorphous Silicon Channel Waveguides for Integrated Photonics," IEEE 3rd Int. Conf. On Group IV Photonics, pp. 255-257, Oct. 9, 2006.

Sparacin et al., "Low Loss Amorphous Silicon Channel Waveguides for Integrated Photonics," slide presentation at IEEE 3rd Int. Conf. On Group IV Photonics, Session FD:Waveguides II, Sep. 15, 2006.

Sparacin, "Process and Desing Techniques for Low Loss Integrated Silicon Photonics," Ph.D. Thesis, Massachusetts Institute of Technology, acessioned and available Jun. 28, 2007.

Borselli et al., "Surface Encapsulation for Low-Loss Silicon Photonics," Appl. Phys. Letts., V. 91, pp. 13117, Sep. 28, 2007.

* cited by examiner

US 7,831,123 B2

MICROPHOTONIC WAVEGUIDE INCLUDING CORE/CLADDING INTERFACE LAYER

This application claims the benefit of U.S. Provisional Application No. 60/842,715, filed Sep. 7, 2005, the entirety of which is hereby incorporated by reference.

STATEMENT REGARDING FEDERALLY SPONSORED RESEARCH

This invention was made with Government support under Contract No. HR0011-05-C-0027 awarded by the Defense Advanced Research Project Agency. The Government has certain rights in the invention.

BACKGROUND OF THE INVENTION

This invention relates to microphotonics, and more particularly relates to microphotonic waveguide design and fabrication.

The field of microphotonics has a promising future not only in telecommunications but also in other high-bandwidth information processing applications. Microphotonics is a planar waveguide technology enabling the monolithic integration all of the necessary components for optical computing onto a single microelectronic chip. These components can include lasers, switches, modulators, detectors, and channel add/drop filters, among other photonic and electronic componentry.

This monolithic integration of photonic and electronic circuits holds the key to overcoming bandwidth limitations that are arising in many computation and communication technologies, and the prospects for integrated photonic circuits are immense. Photonic interconnects offer high data-transportation bandwidths with low signal attenuation and virtually zero heat dissipation; and therefore excel where electronic interconnects are limited. Strategic replacement of bandwidth-limited electronic interconnects, such as off-chip memory input/output bus or board-to-board connections in cluster computers, with photonic interconnects can dramatically improve data processing performance. Similarly, the shift towards multi-core architectures also calls for photonic interconnects as high-bandwidth, cross-chip interconnects are implicit in this technology. Photonic interconnects can also be advantageously employed in a chip clock signal distribution system, where reduced jitter, skew, delay, crosstalk and power consumption enabled by the photonic interconnects can all benefit microprocessor performance.

Integration of photonic circuits onto electronic chips can also enable networking technologies that have higher complexity and unique functionality. In the manner of an electronic circuit, an integrated photonic circuit benefits from lower cost, higher reliability, and increased functionality in comparison to linked discrete components. These attributes can benefit and enable network router and transceiver technologies, which currently comprise multiple discrete photonic components, by increasing performance and ultimately reducing cost.

The added microphotonic integration benefits of reduced weight, volume, and power consumption also enable technologies for which these savings can be crucial. The bandwidth-distance limitation of electronic interconnects has conventionally led to a bottleneck in an ability to transport data as fast as it can be processed. The implementation of integrated photonic interconnects holds the promise of bridging microelectronics-based computation technologies with photonics-based communication technologies, thereby eliminating this bottleneck. Ultimately, the unique and cost-effective data processing abilities that accompany integration of photonic circuits with conventional microelectronic circuits can enable the realization of superior communication and computation technologies.

In a manner similar to that of microelectronics, there is a drive for smaller microphotonic devices to enable faster and more complex devices with higher microelectronic wafer yield. Microphotonic device size cannot be arbitrarily reduced, however, because the device size is directly dependent on the index of refraction difference, $\Delta n$, between each of the materials included in a system of materials employed for the device. Small photonic devices can be realized when materials having large differences in index of refraction are used.

As the size of photonic devices is reduced and the corresponding index of refraction difference between adjacent device materials is increased, several device challenges arise. For example, the roughness of device surfaces becomes increasingly problematic and results in transmission loss as the index of refraction difference is increased. Roughness arises due to a variety of fabrication conditions in waveguide processing and is conventionally always present. The ability to reduce roughness on the top, bottom, and sidewalls of a microphotonics device such as a waveguide is dependent on the materials system employed for the device.

One well-established microphotonics materials system is the silicon-silicon dioxide materials system. Silicon (Si), typically employed as a waveguide core material, is characterized by a refractive index of about 3.5 at telecommunications wavelengths, and silicon dioxide ($SiO_2$), typically employed as a waveguide cladding material, is characterized by a refractive index of about 1.46 at telecommunication wavelengths. The Si—$SiO_2$ system has been extensively utilized and studied in the microelectronics industry. Not only is the Si—$SiO_2$ system well known, but it has a very high $\Delta n \approx 2$, enabling small and compact microphotonics devices.

Conventionally, a Si waveguide core is preferably fabricated of crystalline Si due to the very low intrinsic bulk transmission loss characteristic of crystalline Si. As a result, in leveraging the high-volume and low-cost of Si-based CMOS processing, the development of a CMOS-compatible integrated photonic circuit technology has resulted in the adoption of single-mode, crystalline Silicon-On-Insulator (SOI) channel waveguides as the optimal waveguide architecture. Unfortunately, the use of crystalline Si waveguides typically confines the complexity of a given photonic circuit to a single level unless expensive wafer bonding fabrication steps are used. For example, epitaxial limitations of SOI-based waveguides constrain their use to a single chip level, which restricts integrated electronic-photonic chip versatility and design freedoms vital to realizing the full potential of an integrated photonic circuit technology. The precision needed for wafer bonding multiple, optically-connected, single crystalline Si layers separated by $SiO_2$ cladding layers has not been reliably demonstrated.

There has been proposed the use of polycrystalline Si, polysilicon as a deposited waveguide core material in addressing the need for a high index-contrast waveguide core material capable of deposition on $SiO_2$ and compliant with the physical and fabrication tolerances utilized in CMOS processing. The use of polysilicon as a waveguide core material offers many of the same benefits of crystalline Si without the restriction on deposition methods. Polysilicon can be precisely deposited by a variety of methods, such as chemical vapor deposition (CVD), sputtering, and E-beam deposition, enabling multiple levels and thus more complex photonic circuits.

Whether crystalline Si, polysilicon, or another material is employed as a waveguide core, it is found that surface smoothing is required to reduce the roughness of device surfaces such that light scattering at all core/cladding interfaces, and the corresponding transmission loss, is minimized. Without surface smoothing, the transmission loss can be sufficiently large to prohibit useful device performance.

SUMMARY OF THE INVENTION

The invention overcomes limitations of prior waveguide designs and fabrication processes to provide a waveguide that enables reduction in waveguide losses and that enables a wide range of processes for tailoring waveguide properties and operational characteristics. In one example, the invention provides a waveguide with a waveguide core having longitudinal sidewall surfaces, a longitudinal top surface, and a longitudinal bottom surface that is disposed on a substrate. An interface layer is disposed on at least one longitudinal sidewall surface of the waveguide core. A waveguide cladding layer is disposed on at least the waveguide core sidewall and top surfaces, over the interface layer. With this construction, the waveguide of the invention provides an interface layer at the waveguide core/cladding interface, that can be tailored for achieving performance required by a given application.

The waveguide of the invention can be produced by, for example, first forming a waveguide undercladding layer on a substrate, and then forming a waveguide core on the undercladding layer. An interface layer is then formed on at least a longitudinal sidewall surface of the waveguide core, and an upper cladding layer is formed on a longitudinal top surface and on longitudinal sidewall surfaces of the waveguide core, over the interface layer.

With this fabrication process and the corresponding waveguide design, the waveguide interface layer of the invention enables a wide range of structure geometries and performance. For example, the waveguide interface layer can provide an intermediate index of refraction, can operate as a membrane to control kinetics of fabrication processes, such as oxidation smoothing processes, can operate to control waveguide core shape, can dope a waveguide core, and can operate as a cap to contain volatile constituents in a waveguide core. The interface layer can also be employed for precise tailoring of device capabilities and performance. Other features and advantages of the invention will be apparent from the following description and accompanying figures.

DETAILED DESCRIPTION OF THE INVENTION

Figure 1A:
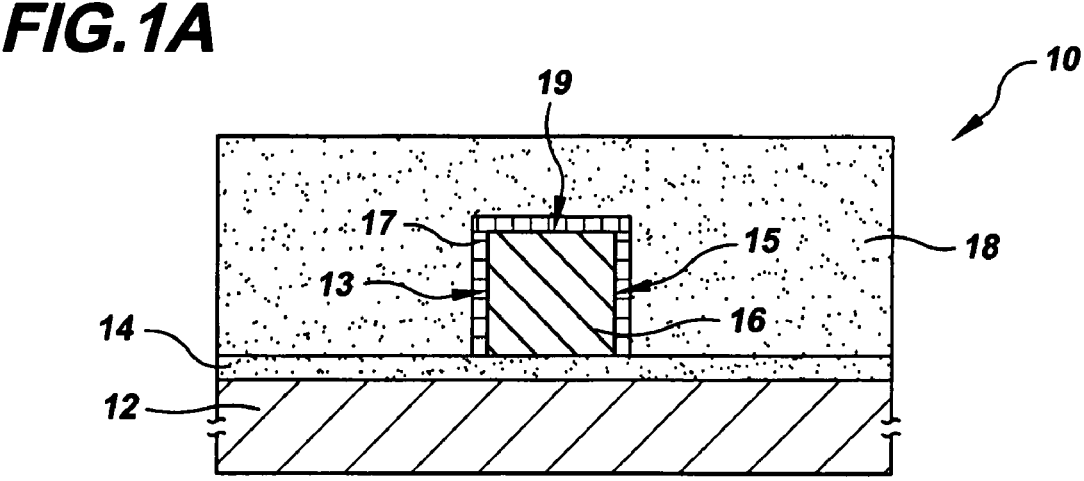
FIGS. 1A-1C are schematic cross-sectional views of three example channel waveguides including an interface layer on the waveguide core between the waveguide core and the waveguide cladding interface in accordance with the invention.

Referring to FIG. 1A, there is shown, in sideview cross-section, an example waveguide configuration 10 in accordance with the invention. The waveguide configuration is not shown to scale for clarity. The example waveguide configuration, which can be termed a so-called channel waveguide, includes a substrate 12 on which is provided a material layer 14 employed as an undercladding layer. A waveguide core material region 16 is provided on top of the undercladding layer 14. An interface layer 17 is provided on the longitudinal side surfaces, i.e., sidewalls 13, 15, and the top surface 19 of the core region 16. An upper cladding layer 18 is provided on top of the interface layer-coated core region 16 and the undercladding layer 14.

Figure 1B:
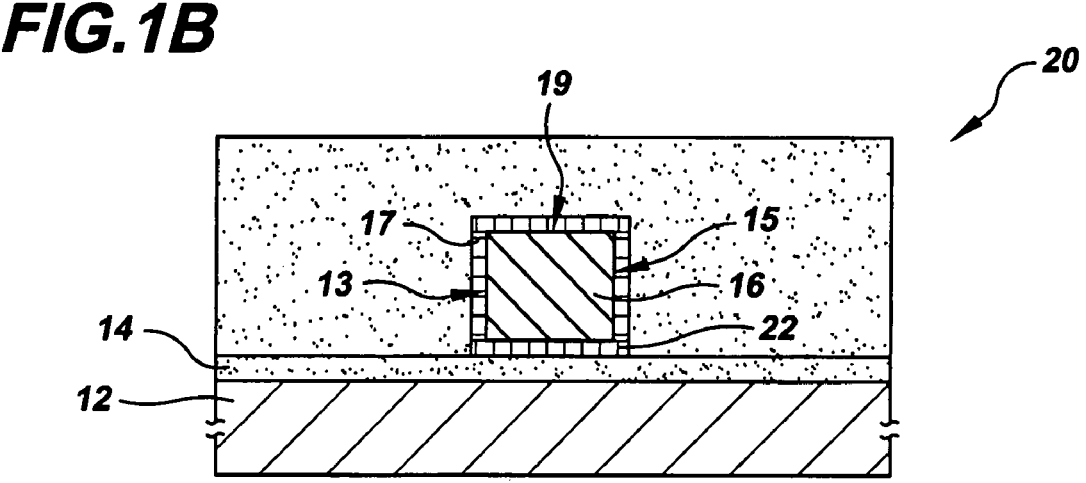

Referring also to FIG. 1B, there is shown a second example waveguide configuration 20 in accordance with the invention. In this second waveguide configuration, there is also provided a substrate 12 on which is provided an undercladding layer 14. A waveguide core material region 16 is provided on top of the undercladding layer 14. An interface layer 17 is here provided on of the longitudinal side surfaces 13, 15, the top surface 19, and the bottom surface 22 of the core region 16. An upper cladding layer 18 is provided on top of the core region 16 and the undercladding layer 14.

Figure 1C:
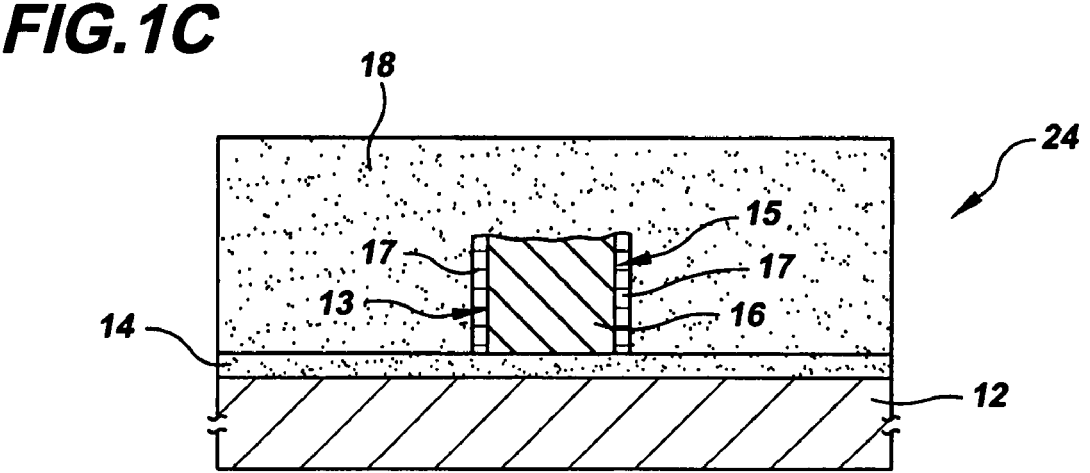

Now referring also to FIG. 1C, there is shown a further example waveguide configuration 24 in accordance with the invention. In this example waveguide configuration, an undercladding layer 14 is provided on a substrate 12, and a waveguide core 16 is provided on top of the undercladding layer 14. The interface layer 17 is here provided only on the longitudinal side surfaces 13, 15 of the core region 16. An upper cladding layer 18 is provided on top of the core region 16 and the undercladding layer 14

In all of the example configurations of FIGS. 1A-1C, the interface layer 17 is required in accordance with the invention to be disposed at the interface of the waveguide core material and the waveguide cladding material. In other words, the interface layer is provided between the core material and the cladding material along at least a portion of the walls of the waveguide core. In the example of FIG. 1A, the interface layer is not provided around all walls of the waveguide core 16 in that the bottom surface of the waveguide core is directly adjacent to the undercladding layer 14 and is not separated from the undercladding by an interface layer. In the example of FIG. 1B, the interface layer is provided all around the longitudinal surfaces of the waveguide core 16, including the sidewalls, upper wall, and lower wall, separating the core from both the undercladding layer 14 and the upper cladding layer 18. In the example of FIG. 1C, the interface layer is provided only on the sidewall surfaces 13, 15, of the waveguide core. Here the top and bottom surfaces of the waveguide core are not separated from the cladding by an interface layer.

All of these configurations are contemplated by the invention as providing interfacial separation between a waveguide core and waveguide cladding. The invention requires only that at least a portion of a waveguide core surface be separated from cladding by an interface layer. For some applications, it can be preferred that only the sidewalls 13, 15 of the waveguide core be separated from the cladding by the interface layer 17. The upper wall 19 and lower wall 22 of the core need not for all applications include an interface layer between the waveguide core and the waveguide cladding. As explained in detail below, depending on a selected application, the upper wall and/or the lower wall of a waveguide core can be provided with an interface layer, but in general, for many applications, it can be preferred that the sidewalls be separated from the cladding by the interface layer 17.

In addition, in the example configurations of FIGS. 1A-1C, the interface layer can be made to extend from under the lower core wall 22, across the undercladding layer 14, resulting in an interface layer between the undercladding layer 14 and the upper cladding layer 18 at substrate areas around the core region. Such a configuration can be imposed based on a selected microfabrication process flow, selected materials system, and selected waveguide application, as described below; the invention contemplates both the structures of FIGS. 1A-1C and a structure in which the interface layer extends out over the undercladding layer 14 beyond the location of the core region.

Further, in the example configurations of FIGS. 1A-1C, a generally rectangular waveguide geometry is indicated. This is provided for clarity of example only. The invention contemplates the use of any suitable waveguide geometry. Waveguides having ridge, rib, channel, wire, strip-loaded, or other cross-sectional geometry can be employed in accordance with the invention. Although a rectangular waveguide is shown in the examples for clarity, it is to be recognized that the invention places substantially no limitation on waveguide geometry.

The example waveguide configurations of FIGS. 1A-1C enable dielectric waveguide operation, which is based on the principle of total internal reflection between the core and cladding components of the waveguide. In this configuration, the selected core material is characterized by a higher index of refraction, n, than the cladding material. The higher index core material then acts as the light guiding medium, facilitating internal reflection of light with the surrounding cladding material. Unlike metallic waveguides, the boundary conditions for dielectric waveguides do not completely limit light to the core only, as a substantial fraction of power is evanescently guided in the cladding and referred to as the evanescent field. The term "waveguide" herein is meant to refer to this dielectric waveguide configuration. Single-mode, high index contrast (HIC), channel waveguides are particularly well-suited for this waveguide configuration. This category of waveguides exhibits high confinement of light in a small waveguide core cross-section and low loss transmission through compact bends with small bend radii, making it well-suited for electronic-photonic integration.

In accordance with the invention, the waveguide interface layer 17 of FIGS. 1A-1C can be employed for achieving a range of device qualities and performance capabilities, as well as for enabling a range of fabrication processes that improve device qualities. Each such application of the interface layer is described in detail below.

For example, the waveguide interface layer of the invention can be designed and employed in the waveguide structure to lower the sensitivity of the roughness of the waveguide core sidewalls to transmission loss. The interface layer of the invention is here specified as a material having an index of refraction value, n, that is between the index of refraction value of the core material and the index of refraction value of the cladding material. With this configuration, the interface layer lowers the $\Delta n$ at the interface of the core and cladding regions of the waveguide. This reduced $\Delta n$ in turn reduces the probability that light will be scattered at the interface of the core and cladding regions for a given roughness of surfaces at that interface, and accordingly reduces the transmission losses of the waveguide.

This application of the waveguide interface layer for reducing transmission loss is particularly well-suited for high index contrast waveguide material systems such as the HIC channel waveguide described above. For this category of waveguide design, the electromagnetic boundary conditions of the waveguide, as-derived from Maxwell's equations, result in a substantial portion of the optical power residing at the core-cladding interface. This in turn can enhance transmission at the interface of the core and cladding. The interface layer of the invention, being disposed right at the core-cladding interface, and reducing the $\Delta n$ at the interface of the core and cladding, can therefore make a significant impact in reduction of transmission loss of the HIC channel waveguide. Other details of this application, as well as other applications of the interface layer, are described below.

First considering waveguide materials selection, the invention provides a range of materials for the HIC channel waveguide structure that are compatible with the interface layer of the invention. For example, high-index core materials that provide this waveguide operation include silicon, III-V semiconductor compounds, high-index glasses, e.g., SiN or SiON, chalcogenide glasses, and other suitable core materials. Low-index cladding materials include $SiO_2$, air, or other suitable materials. The interface layer material is selected based on corresponding core and cladding materials. The interface layer can be provided as, e.g., a III-V semiconductor compound, a high index glass, e.g., SiN or SiON, a chalcogenide glass, or other suitable material.

The invention also provides a range of microfabrication process techniques for producing the waveguide configurations of FIGS. 1A-1C. In several of the example fabrication processes described below silicon-based waveguide materials are described. But it is to be recognized in accordance with the invention that such is not required, and that other waveguide materials systems can be employed. For example, III-V semiconductor compounds, $SiO_2$-based glasses, chalcogenide glasses, or other suitable material can be employed, as described above.

First considering Si-based waveguide fabrication technologies, there are a range of processes that can be carried out in accordance with the invention for employing single crystal silicon, amorphous silicon, polycrystalline silicon, silicon nitride, and other silicon-based materials. FIGS. 2A-2I are schematic sideviews of generalized process steps for producing a silicon-based waveguide configurations. In a first process step, referring to FIG. 2A, an undercladding layer 14 is provided on a substrate 12, e.g., a silicon substrate. The undercladding layer is intended to optically isolate the waveguide from the substrate. The required materials properties and thickness of the undercladding layer are dependent on the light confinement of the waveguide, which is dependent on the index difference, $\Delta n$ between this undercladding layer and the waveguide core material, as well as waveguide geometry.

$SiO_2$ is an optimal undercladding material for a Si waveguide core due to its low index of refraction (n=1.445), optical transparency, and electrically insulating properties.

Both thermally grown and deposited oxide, for example, formed by chemical vapor deposition (CVD), such as plasma enhanced chemical vapor deposition (PECVD) are well suited deposition techniques. One detriment to using $SiO_2$ is its amorphous structure, which precludes the growth of crystalline waveguide materials on top of the amorphous layer. To surmount this problem, it can be preferred for many applications to employ Silicon-on-Insulator (SOI) substrates, which provide a thin layer of crystalline silicon on top of a layer of oxide supported by a silicon substrate. The oxide layer thus need not be deposited but can be provided in the starting substrate configuration itself. For cases where the waveguide core material has a larger index than the substrate, such as when using silica substrates, an undercladding layer may not be necessary for all applications and thus is not required for all applications.

Figure 2A:
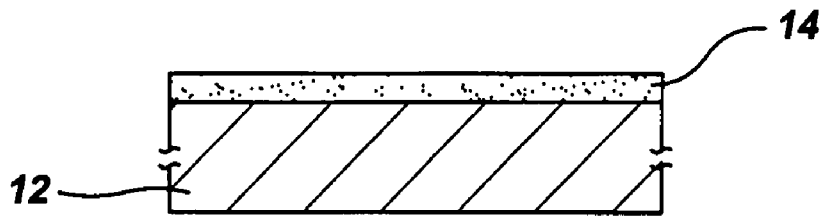
FIGS. 2A-2F are schematic cross-sectional views of steps in an example fabrication process provided by the invention for producing a channel waveguide including the interface layer of the invention.
Figure 2B:
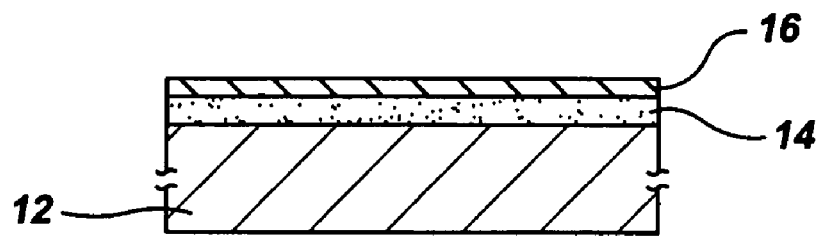

In a next process step, referring to FIG. 2B, a waveguide core material 16 is provided on the undercladding layer. If a SOI substrate is employed, in the manner described in detail below, the silicon layer of the SOI configuration can be exploited to form the waveguide core layer. Otherwise, materials can be deposited to form the core layer. Polysilicon, amorphous silicon, silicon nitride, or other suitable material can be deposited to form the waveguide core material layer as described below. As explained above, in the instant example, a silicon-based waveguide is assumed for clarity, but it is to be recognized that other waveguide material systems can be employed in the interface layer fabrication process of the invention.

The deposition parameters of the waveguide core materials can have a large impact on material microstructure, which can affect material scattering, absorption, or surface roughness. Chemical vapor deposition, e.g., PECVD, or other selected deposition technique can be employed. The waveguide core layer thickness is selected based on waveguide design parameters such as waveguide type, e.g., ridge or channel type, and waveguide mode, e.g., single or multi-mode. Specific waveguide core layer deposition processes are discussed in detail below.

Considering the particular example of a silicon waveguide core material, the operational properties of the waveguide are impacted by the silicon properties, e.g., electronic doping. The two major material properties relevant to waveguides are index of refraction and optical absorption. Within the band of wavelengths employed for telecommunications, undoped Si is virtually transparent. However, for doped Si, free carriers result in dispersion, $\Delta n$, and loss, $\Delta a$. The extent of dispersion and loss per cm is proportional to the free carrier concentration and can be calculated for, e.g., $\lambda = 1550$ nm as:

$$\Delta n = -[8.8 \times 10^{-22} \Delta N + 8.5 \times 10^{-18} (\Delta P)^{0.8}] \quad (1)$$

$$\Delta a = [8.5 \times 10^{-18} \Delta N + 6.0 \times 10^{-18} \Delta P] \quad (2)$$

where $\Delta N$ and $\Delta P$ are the electron and hole concentrations in units of $[cm^{-3}]$, respectively. The doping concentration of a Si waveguide core therefore is preferably considered for its impact on dispersion and loss for a given application.

Figure 2C:
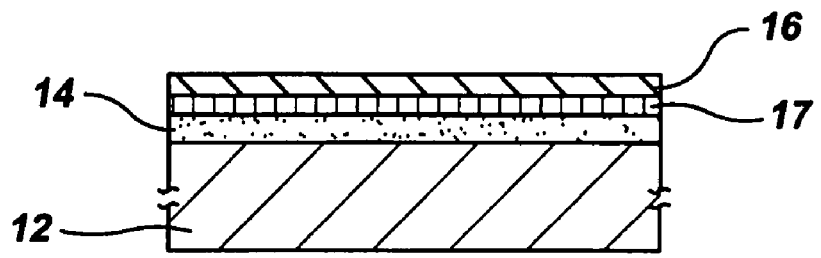

Turning back to the waveguide fabrication sequence and referring to FIG. 2C, if the waveguide configuration of FIG. 1B is desired, in which a core/cladding interface layer 17 is provided under the waveguide core lower surface 22, then prior to the step of forming the waveguide core layer 16, a lower interface layer 17 is deposited. The composition and thickness of the interface layer is selected based on a given application, as explained in detail below. For example, an interface layer of silicon nitride can be employed for many applications, as explained below. An interface layer thickness of, e.g., between about 1 nm and 100 nm can be suitable for many applications. The thickness of the interface layer is preferably selected based on a given waveguide application and can be selected to be proportional to the waveguide core dimensions, which in turn are dependent on material selection, as explained below. CVD or other suitable deposition technique can be employed to form the lower interface layer. For example, LPCVD or PECVD can be employed to form a nitride interface layer. Because the temperature required for PECVD processing is generally lower than that required for LPCVD processing, PECVD processing can be preferred for applications in which waveguide materials are sensitive to processing temperature.

It is recognized that the formation of the interface layer at the lower surface of the core layer requires that the core layer be deposited subsequent to the interface layer deposition. SOI substrate configurations therefore do not allow for this step. Thus, if it is desired for a given application to provide an interface layer under the waveguide core layer, as in FIG. 1B, then a deposited waveguide core structure is required, otherwise, the SOI substrate configuration enables production of a waveguide structure as in FIG. 1A.

Figure 2D:
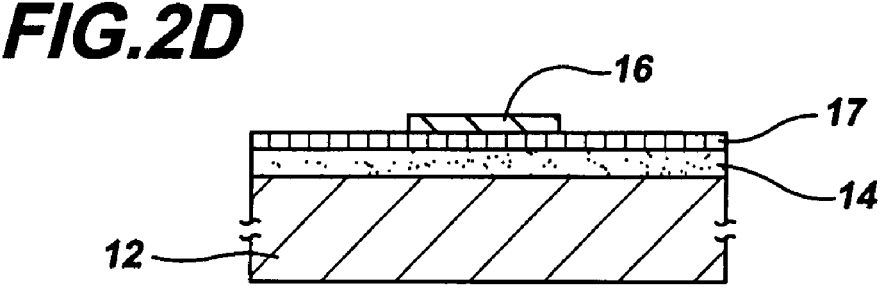

In a next process step, referring to FIG. 2D, the waveguide core layer 16 is patterned and etched to form a selected waveguide geometry. The depth of the etch is dependent on the waveguide geometry desired. For example, for waveguide channel, wire, and strip-loaded waveguide geometries, the etch depth is nominally equivalent to the waveguide core layer thickness. But for some applications, such as when the interface layer is to be employed as a diffusion barrier, as described below, it can be preferred for the etch depth to exceed the waveguide core layer thickness and to extend through the underlying layer. In this case, it can be required to adjust the etch chemistry once the etch reaches the material underlying the core layer. Alternatively, for ridge waveguide geometries, the etch depth is preferably less than the core layer thickness.

For clarity, in FIG. 2D and subsequent figures the lower interface layer 17 is shown, but it is to be recognized that such is not required as explained previously in connection with FIG. 1A. In patterning the waveguide core layer 16, any suitable lithographic processing that is compatible with the dimensions of the waveguide can be employed. For example, first can be deposited photoresist, by spin coating or other suitable technique. The chemistry and thickness of the photoresist are preferably optimized for the wavelength of light to be used to expose the photoresist for a desired waveguide pattern and dimensions. Deposition of photoresist can be in any conventional manner, e.g., by a spin-on technique, or other selected technique. Photoresist thickness is set primarily to be compatible with minimum feature size and processing requirements, such as etch depth at a known selectivity and exposure time for a given UV-irradiation dose. After the spin-on step a soft-bake can be preferred to be used to drive out the carrier solvent to give mechanical and chemical stability.

A selected photolithography mask for the waveguide core design is then aligned to the substrate. In one conventional example, the mask is provided as a slab of high optical quality quartz with a metallic chrome pattern in the shape of the circuit. The pattern is written with nm-scale accuracy with, e.g., an e-beam. Alignment of the mask is critical when multiple chip levels are used; alignment error will result in reduced photonic device performance. The waveguide core pattern is then transferred from the mask to the photoresist by exposing and chemically altering the photoresist with, e.g., ultraviolet light, or radiation of another selected wavelength. The resolution of the pattern transfer scales inversely with the wavelength of light used. In most cases, an additional soft-bake step can be preferred to improve the photoresist properties. The photoresist is then developed, whereby the portions of the resist that are exposed are chemically altered, thereby selectively dissolving when in the presence of the developing solution. A hard-bake anneal step can then be employed to drive out water and solvents, and to cross-link the polymer in the resulting pattern.

With the photoresist developed, the waveguide core layer 16 is then etched to transfer the waveguide core pattern from the photoresist to the waveguide core material. Here the etch chemistry is used to remove the waveguide core material that is not protected by the photoresist. In one example silicon waveguide core etch, a plasma etch of $HBr:Cl_2:He:O_2$ can be employed. Etch selectivity between the waveguide core material and photoresist is critical for ensuring dimensional integrity of the core. Etch chemistry and polymerization on the core sidewalls are also important for ensuring a near 90° etch angle and minimized line edge roughness at the core sidewalls. At the completion of the etch step, the photoresist is removed. It is important to ensure that a selected chemistry, e.g. piranha etch, which is $H_2O_2$ and $H_2SO_4$ in a 1:3 ratio, or a dry oxygen plasma etch, such as ashing, used in removing the photoresist will not adversely affect the underlying waveguide materials. In particular, damage to the optical interfaces in this process may affect the waveguide transmission properties.

Figure 2E:
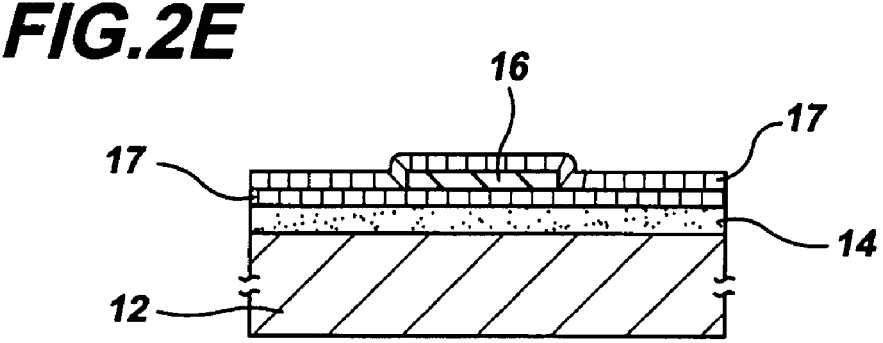

Referring to FIG. 2E, in a next process step, an interface layer 17 is deposited on the top and sidewalls of the patterned waveguide core 16. The interface layer preferably is sufficiently conformal to well-coat the sidewalls of the waveguide core. The CVD deposition techniques described above can here be employed for this interface layer deposition. For example, SiN can be deposited by PECVD or LPCVD.

Figure 2F:
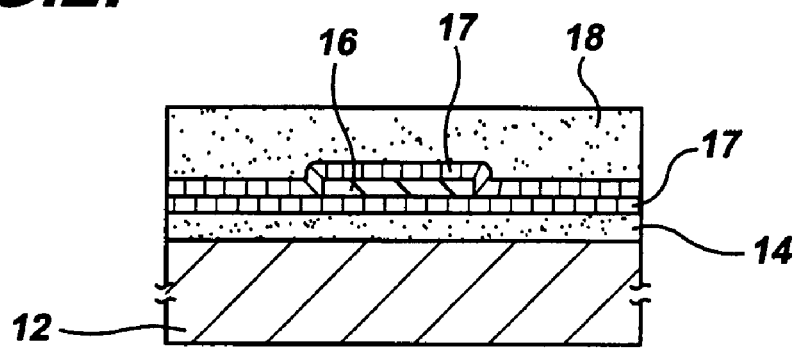

In a final process step, referring to FIG. 2F, the top cladding layer 18 is then deposited to form a top cladding on the waveguide structure. The cladding layer coats the interface layer. There are many advantages to using a top cladding: it shields the interface layer on the waveguide core upper surface from contamination, reduces the amount of birefringence by providing a symmetrical structure for the guided mode, and facilitates easier sample preparation. The top cladding layer 18 can be formed of, e.g., PECVD $SiO_2$, a spin-on glass, or other suitable material for the selected waveguide core and interface materials.

With this general waveguide interface fabrication process described, now is considered more particularly a waveguide fabrication process employing a Silicon-on-Insulator (SOI) substrate configuration. SOI wafers are commercially available substrates that were originally developed for high speed microprocessors. SOI wafers include a thin crystalline silicon layer, e.g., of between about 0.05 µm to 100 µm in thickness, bonded to a thermal $SiO_2$ layer, which is in turn bonded to a thicker silicon wafer that acts as a mechanical support. Transistors built on SOI substrates benefit from a reduced active volume, due to the lower insulating layer, which lowers the parasitic capacitance and thereby increases switching speed. The insulated active region also enables full depletion of carriers in the gate region, which reduces device power consumption, current leakage, and heat output.

It is a fortunate circumstance for electronic and photonic integration that SOI is also an ideal photonic platform as well. The configuration and high index of refraction difference ($\Delta n=2$) between the Si and $SiO_2$ layers enables production of photonic interconnects that are highly confined, optically insulated, and of sub-micron cross-section, and that are compliant with the physical and fabrication tolerances of CMOS processing. The high quality interface between Si and $SiO_2$ layers that is typical of a SOI wafer also provides atomically smooth interfaces, which can be important for low-loss optical routing. In addition, the ability to leverage the CMOS processing knowledge base, infrastructure, and economics as well as optical transparency with the telecommunications spectrum further enhances the attractiveness of SOI-based waveguides. The only real detriment to SOI-based waveguides is the single-level restriction imposed by epitaxial constraints.

The most common SOI fabrication process is the UNI-BOND SOI fabrication process, which joins two Si wafers by an oxidation bonding method. The top Si layer thickness is tailored by the Smart Cut™ process, where hydrogen is implanted at a chosen depth, which weakens the Si wafer and forms a cleavage plane at which the unwanted portion of the bonded wafer can be removed. The Smart Cut™ process avoids a costly and timely polishing step. Post-Smart Cut™, the top Si layer can be polished to sub-nm roughness for electronic and optical device fabrication.

SOI waveguide fabrication, following the process flow of FIGS. 2A-2F described above, is commenced with wafer cleaning, followed by photoresist deposition on the upper thin silicon layer of the SOI structure. Deep-UV photolithography, e.g., at a wavelength of, e.g., $\lambda=248$ nm, can be employed to attain the lithographic resolution needed for fabricating sub-micron waveguide core dimensions and is preferred to expose the waveguide core mask and transfer the core pattern into the resist. Post-development, the silicon layer is etched to form the waveguide core, e.g., with an Applied Materials Centura II DPS poly etch plasma etch chamber using, e.g., $HBr/Cl_2/HeO_2/CF_4$ chemistry or other suitable plasma etch chemistry or etch process. Afterwards, the resist is removed by, e.g., oxygen plasma ashing. With this step complete, the structure of FIG. 2D is produced without the lower interface layer 17 of the structure in FIG. 2D.

In a next step, a selected upper interface layer is then deposited on the formed waveguide core. As explained above, the interface layer material is selected based on a desired functionality for a given application. In one example, a SiN interface layer of less than about 20 nm in thickness can be here employed with a SOI Si waveguide core. The core sidewalls and upper wall are here coated with the interface layer. A top cladding layer, e.g., a 3 µm-thick $SiO_2$ top cladding layer, can then be deposited by, e.g., high density plasma (HDP) plasma enhanced chemical vapor deposition (PECVD) from $SiH_4$ and $O_2$ chemical precursors, or other selected deposition technique. HDP PECVD can be preferred for its low temperature deposition and superior high aspect ratio trench filling properties. With the top cladding layer in place, the single crystal Si waveguide is complete.

Now turning to fabrication process details in which an SOI substrate configuration is not employed, and instead the waveguide core material is deposited as a non-crystalline starting material, as described earlier, silicon nitride, polysilicon, amorphous silicon, or other waveguide core material can here be employed. Considering the silicon-based materials system example introduced above, then similar to SOI-based waveguides, deposited waveguide materials must have a high index of refraction and compatibility with $SiO_2$ to enable a highly confined, optically insulated, sub-micron cross-section, which is compliant with the physical and fabrication tolerances utilized in CMOS processing. Given that amorphous $SiO_2$ claddings can be preferred for many applications, the range of possible deposited waveguide core materials are epitaxially restricted to those that are characterized by amorphous or polycrystalline morphologies. Three CMOS-compatible deposited waveguide materials are particularly well-suited for this condition: silicon nitride, amorphous silicon (a-Si), and polycrystalline silicon. The dominant loss mechanisms in these materials are roughness-scattering and material absorption.

In many ways, silicon nitride is an ideal deposited waveguide core material. The index of refraction, n, of SiN ranges from its stoichiometric ($Si_3N_4$) value of 2.0 to 2.25 for silicon-rich SiN. While this index of refraction is considerably lower than that of silicon, it is still large enough to sustain sub-micron, single-mode waveguide cross-sections with bend radii on the order of 10 μm. In some ways, the lower index contrast is advantageous as it relieves the high sensitivity to sidewall roughness that is characteristic of Si waveguides. SiN is also transparent over a wide range of wavelengths, including a wavelength, λ=850 nm, (unlike Si,) at which inexpensive GaAs light emitters exist, and there are multiple methods of depositing SiN, some of which are at low temperatures; this is a particular benefit for multiple chip levels structures including those with temperature-sensitive materials beneath. In addition, SiN is amorphous and thermally stable, and therefore does not transform into a polycrystalline material at relevant process temperatures in the manner of a-Si.

However, there are some limitations that preferably are considered when employing SiN as a waveguide core material. SiN does not exhibit optoelectronic properties and its thermo-optic response, used for trimming the waveguide index, is quite low. However, for passive optical routing applications, these properties are often not necessarily required. Film stress in deposited SiN films, especially stoichiometric $Si_3N_4$ films, can preclude the growth of ideal waveguide film thicknesses, due to film cracking, but a relatively high level of Si content can be employed to reduce film stress, and increases the index of refraction of the material. Finally, and most importantly for optical loss, the presence of hydrogen in SiN films results in the presence of N—H bonds which absorb in the telecom spectrum. The degree of hydrogen incorporated in the SiN film is process-dependent.

The hydrogen incorporation in a SiN film results in a dominant loss mechanism of SiN material absorption. SiN material absorption in the telecom spectrum occurs due to the presence of nitrogen-hydrogen (N—H) covalent bonds which arise from imperfect dissociation of gaseous precursors, such as $SiH_4$ and $NH_3$, used in the deposition process. N—H bonds act as absorption centers in the telecom spectrum, adversely affecting waveguide transmission. The degree of this loss scales with the concentration of N—H bonds and is largely dependent on the deposition method.

Low pressure chemical vapor deposition (LPCVD) and plasma enhanced chemical vapor deposition (PECVD) are the two best-suited methods for depositing high-quality SiN films. LPCVD films can be grown at relatively high temperatures of, e.g., between about 750° C. and about 900° C., and low growth rates (~nm/min) with comparatively low H-content, typically less than a few atomic percent. In comparison, PECVD films can be grown at relatively lower temperatures of, e.g., between about 300° C. and about 500° C., with higher growth rates (100 nm/min), but with higher H-content, ranging from 20-50 atomic percent. The large disparity between H-content in the two deposition processes is mostly due to the process temperature. The higher kinetic energy imparted to the film at higher temperatures drives out the hydrogen from the N—H bonds and reduces the H content in the films. Consequently, to achieve the lowest loss waveguide operation, e.g., 0.1 dB/cm, a SiN waveguide core is preferably produced with LPCVD films that are further annealed in the manner described below.

However, where a given application requires the use of a SiN layer as an upper chip level waveguide, it can be preferred to employ a low-temperature deposition process to remain compatible with lower level devices that may have with low thermal budgets. For example, germanium modulator and detector devices, which have melting temperatures near 700° C., can not in general be subjected to a high-temperature SiN deposition process. This constraint can for such applications require the used of PECVD-deposited SiN materials as a viable waveguide core material.

For applications in which it is desirable to reduce the SiN waveguide core absorption loss in these materials, the PECVD precursor chemistries are preferably optimized to decrease the H incorporation in the film. By employing $N_2$ as a precursor instead of $NH_3$, the atomic percentage of hydrogen can be decreased from 18.3% to 9.9%, corresponding to a SiN (n=2.0) bulk material loss decrease from 4.3 to 2.8 dB/cm for λ=1550 nm, as measured by a Metricon prism coupler.

In one example of the waveguide configuration of FIG. 1B, here with SiN employed as a waveguide core material, a 400 nm-thick SiN core film can be deposited on a lower undercladding layer and lower interface layer in the manner of the process flow of FIGS. 2A-C. Example deposition processes for SiN are: PECVD with $SiH_4$ at 140 sccm, $N_2$ at 4900 sccm, P=3 torr, power=440W, spacing 640 mils, and T=400° C.; PECVD with $SiH_4$ at 157 sccm, $N_2$ at 4850 sccm, P=3 torr, power=485 W, spacing 640 mils, and T=500° C.; or a vertical tube reactor with 250 sccm $SiC_{12}H_2$, 25 sccm $NH_3$, P=250 mT, and T=775° C. A SiN channel waveguide core can then be defined in the layer by, e.g., photolithography with an I-line stepper, λ=365 nm, and etched, e.g., with the a plasma etcher such as the AME 5000 plasma etcher from Applied Materials, with $CF_4$ flowing at 8 sccm and $O_2$ flowing at 6 sccm at 50 mTorr, 250 W, and 100 Gauss.

Given a SiN waveguide core, the interface layer material is selected based on a desired functionality, as explained in detail below. Example interface layer materials for SiN waveguide cores include SiON, TiN, chalcogenide glasses, $LiNbO_3$, Ge, or other selected material. The thickness of the interface layer is selected based on a desired application, as described below. Similarly, the cladding layer material is selected based on the desired functionality. A deposited oxide cladding material can be formed to complete the SiN waveguide structure.

Turning now to a second deposited waveguide core material, amorphous silicon, amorphous silicon (a-Si) is an attractive waveguide core material, exhibiting for many of the desirable attributes of crystalline silicon. Amorphous silicon has a high index of refraction, n, that can range between about 3.5 and about 4.0, depending on process conditions. Amorphous silicon is also attractive because of its CMOS compatibility and an extensive process knowledge base for producing a-Si. In addition, a-Si can be deposited by a variety of low-temperature deposition methods which as explained above, can be preferred for producing upper chip level waveguides in process scenarios having limited thermal budgets due to lower chip level temperature restrictions, such as melting temperature and electrical dopant diffusion.

It is to be recognized, however, that optical absorption can be a major limitation in using a-Si as a waveguide core material. Unlike crystalline silicon, in which atoms are regularly arranged on a periodic lattice, a-Si only has short-range atomic order, which results in structural defects in the form of distorted bond angles, dangling bonds, and altered atomic bonding coordination. This short-range order drastically alters the density of states near the bandgap of a-Si. In a crystalline semiconductor, the density of states within the band gap is by definition zero. However, the density of states for an amorphous semiconductor is not identically zero within the bandgap. The long range disorder of the amorphous lattice causes band-tail states, which exponentially decay from the valence and conduction bands into the band gap. Additionally, the presence of dangling bonds results in mid-gap electronic states, which can have a negative, neutral, or positive ($D^-$, $D^0$, $D^+$) charge, depending on the energy of the dangling bond. These mid-gap states can act as optical absorption centers for sub-bandgap light and are the cause of infrared absorption in a-Si.

Hydrogen can be incorporated into the a-Si lattice to passivate these dangling bonds, thereby which reducing the number of mid-gap states and absorption centers. For passive waveguide applications, hydrogenation of a-Si is preferred to enable obtaining the production of a low-loss a-Si waveguide material. To further emphasize this point, fabrication of a-Si waveguides by ion bombardment of SOI substrates, a process which creates unpassivated a-Si, i.e., without incorporation of hydrogen, is found to yield channel waveguides with ~300 dB/cm absorption-dominated transmission losses.

Plasma enhanced chemical vapor deposition (PECVD) of amorphous silicon from the decomposition of monosilane ($SiH_4$) is one example method for depositing an amorphous hydrogenated silicon film in the production of a waveguide core layer. PECVD of a-Si is a low temperature, high deposition-rate process that incorporates hydrogen in the film as a result of imperfect dissociation of the $SiH_4$ precursors. A low temperature deposition is not only important for process integration, it is also important for maintaining a-Si material properties. Above about 575° C., a-Si materials crystallize and form polycrystalline silicon materials which are known to be lossy.

In fabrication of a waveguide configuration like that of FIG. 1B with an amorphous silicon waveguide core region, the core can be formed, of, e.g., a 200 nm-thick a-Si layer deposited by PECVD with, e.g., an Applied Materials P5000 CVD system, with 100 cc/min $SiH_4$, 2000 cc/min Ar, T=450° C., spacing 400 mills, P=4.5 Torr, and Power=100 W. Deep UV photolithography at a wavelength $\lambda$=248 nm can be used to define the waveguide core pattern. The amorphous silicon layer can be deposited on a selected interface lower layer if desired, as described above. The a-Si layer can then be etched with, e.g., a chemistry of $HBr/Cl_2/HeO_2/CF_4$ to define a waveguides core with low roughness.

For an amorphous silicon waveguide core, an interface layer of, e.g., SiN, can be employed or other suitable interface material. Here, e.g., a thin, e.g., 10 nm-thick, layer of SiN can be deposited prior to the a-Si layer deposition and subsequent to the a-Si layer deposition to encapsulate the core structure prior to the top cladding deposition. The lower SiN layer has the added bonus of acting as an etch stop and an ARC layer. An upper cladding layer, of e.g., deposited oxide, can then be deposited in the manner described above.

Figure 3A:
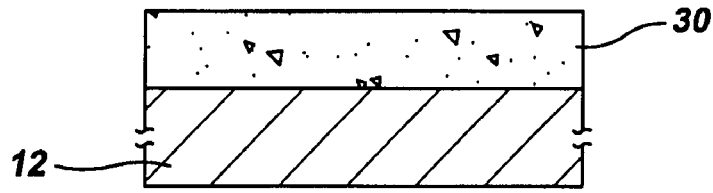
FIGS. 3A-3G are schematic cross-sectional views of steps in an example damascene fabrication process provided by the invention for producing a channel waveguide including the interface layer of the invention.
Figure 3B:
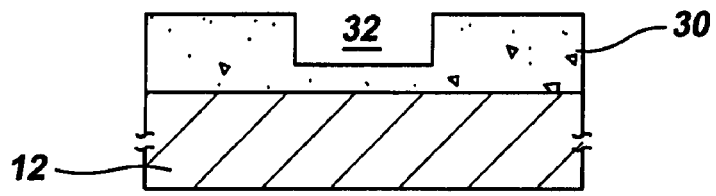

In accordance with the invention, a damascene fabrication process can also be employed to produce an a-Si channel waveguide configuration having the geometry of that shown in FIG. 1B. Referring to FIG. 3A, in a first step of a damascene process in accordance with the invention, a cladding layer 30 is deposited on a substrate 12. For example, a layer of $SiO_2$ can be deposited by chemical vapor deposition on a silicon wafer as a substrate. The cladding layer 30 is formed to be of a thickness that is greater than an intended height of the waveguide core. For an a-Si channel waveguide, the waveguide dimensions can be set at, e.g., about 0.2 µm×about 0.5 µm Referring now to FIG. 3B, in a next process step, a trench 32 is formed in the cladding layer 30 by suitable lithographic and etch processes. A suitable fluoride-based etch chemistry can be preferred, e.g., a $CF_4$—$O_2$ chemistry. The trench width is set based on an intended width of the waveguide core and an intended thickness of the waveguide interface layer of the invention. With the trench thusly formed, the cladding layer 30 provides an undercladding region, under the trench, and side cladding regions, adjacent to the trench.

Figure 3C:
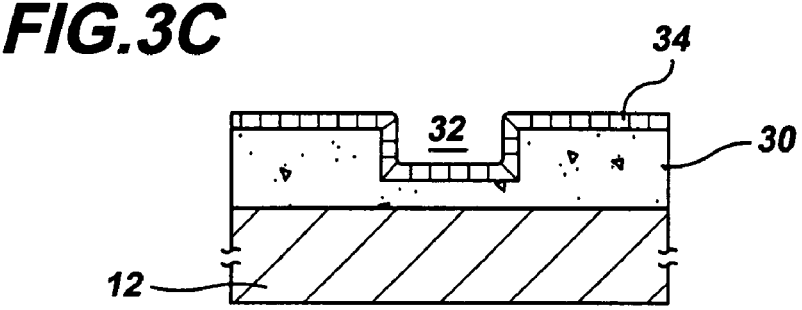
Figure 3D:
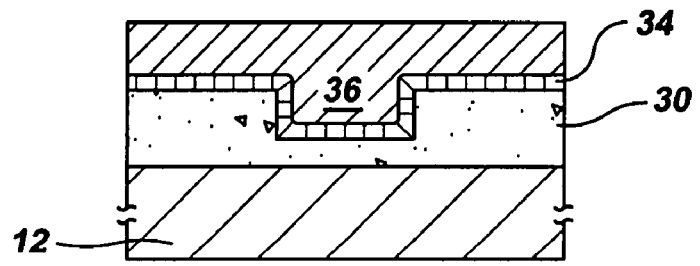

Referring to FIG. 3C, in a next process step, a lower interface layer 34 is deposited on the cladding layer 30. The interface layer can here be provided as, e.g., $Si_3N_4$, or other suitable interface material, and deposited by LPCVD or other suitable formation process. The thickness of the interface layer is set given the considerations for the waveguide discussed above. Then, as shown in FIG. 3D, with the lower interface layer 34 in place, the trench 32 is filled with a selected waveguide core material 36. For most Si waveguide damascene process applications, amorphous silicon can be the preferred deposited core material, formed by, e.g., low-power PECVD deposition with a $SiH_4$ precursor, for producing a low bulk-loss, hydrogenated a-Si core.

Figure 3E:
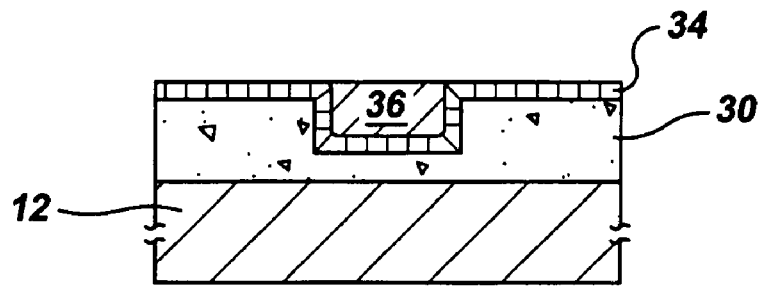
Figure 3F:
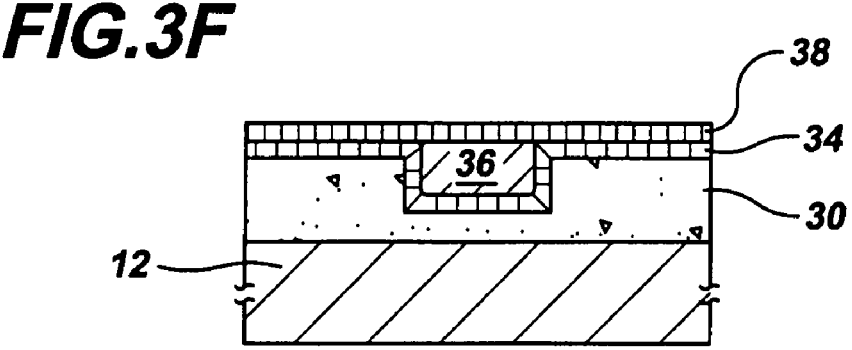

Referring to FIG. 3E, the structure is then subjected to a polishing step, for example, chemical-mechanical polishing (CMP), to planarize the structure such that the core material 36 is defined for a channel waveguide as a rectangular region within the trench. Then, as shown in FIG. 3F, an upper interface layer 38 is deposited. With this interface layer deposition, all of the top, bottom, and sidewalls of the core region 36 are coated with the interface material. The upper interface layer 38 can be the same as that of the lower interface layer 34 or different, and can be formed with a differing process if desired. For example, while a lower interface layer of silicon nitride can be formed by LPCVD or PECVD, it can be preferred, for thermal considerations, to deposit the upper interface layer by PECVD over the amorphous silicon waveguide core material.

Figure 3G:
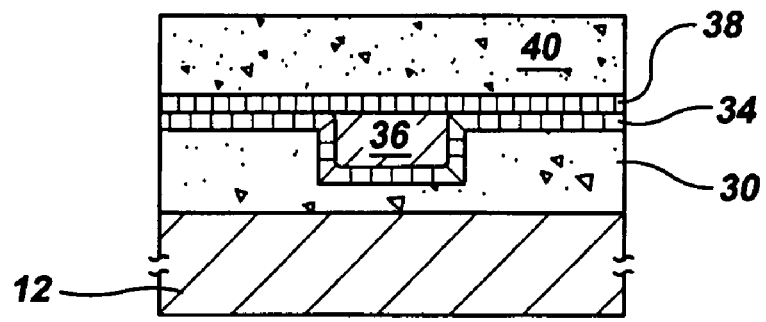

Referring to FIG. 3G, an upper cladding layer 40 is then deposited over the upper interface layer 38. The upper cladding layer 40 can be formed of, e.g., $SiO_2$, and can be deposited by, e.g., CVD or other suitable process. With this upper cladding layer deposition, the channel waveguide is complete, with the interface layer of the invention provided at all sidewalls of the waveguide core. This damascene process can be preferred for applications in which a reduced optical layer thickness is desired, e.g., to reduce material stress in the thin film stack that can be require for complex planar lightwave circuits.

In general in accordance with the invention, but in particular for the damascene process of the invention, the interface layer can be provided as a supersaturated layer, such as an oxygen-rich layer of $SiO_2$, which when annealed at high temperatures, will return to stoichiometry and diffuse the excess oxygen out of the interface layer into the core material. The oxygen that impinges on a Si core can react and result in oxidation smoothing of the core material in the manner described below.

Turning now to a third example of a deposited waveguide core material, polysilicon can be employed as a waveguide core material with the interface layer of the invention. Unlike crystalline silicon, which is deposition-limited, and amorphous silicon, which is process temperature-restricted in general to a temperature less than about 650° C. to maintain an amorphous morphology, polycrystalline silicon is restricted by neither deposition limitation. Hence, polysilicon can be a preferable waveguide core material for applications in which deposition and process temperature freedoms are necessary. However, light scattering due to rough interfaces and grain boundaries, and bulk absorption from dangling bond defects, can limit polysilicon waveguide performance.

In the fabrication of a waveguide structure like that of FIG. 1B with a polysilicon waveguide core, a selected core layer thickness, e.g., a 200 nm-thick layer of core material, can be formed by, e.g., PECVD of a-Si deposited with an Applied Materials P5000 CVD system with 100 cc/min $SiH_4$, 2000 cc/min Ar, T=450° C., 400 mills spacing, P=4.5 torr, and Power=100 W. The a-Si is deposited in the manner described above and in FIGS. 2A-2C. The a-Si can then be annealed to crystallize the amorphous material and form polysilicon.

This annealing process can be carried out in several ways. In a first example process, the a-Si layer is annealed to produce a layer of polysilicon prior to the step of etching to form the waveguide core geometry. In a second process, the a-Si layer is first etched in the waveguide core geometry and the interface layer deposited prior to an annealing step. The a-Si etch process described above and the interface layer material of SiN described above can here be employed. In either scenario, an anneal step of, e.g., 650° C. for, e.g., 2 hours, can be employed. The slab anneal approach of annealing prior to core etch may serve to comparatively reduce bulk absorption and top surface roughening. In comparison to an etched a-Si waveguide structure, the slab anneal approach has a smaller a-Si surface area-to-bulk ratio, which reduces the extent of hydrogen out-diffusion. Also, the presence of film stresses may serve to suppress surface roughening during crystallization.

With the polysilicon core thus formed, a suitable polysilicon etch is carried out to pattern the core, and then the interface and upper cladding layers are deposited in the manner described above. A polysilicon core waveguide is thusly formed. The polysilicon core can alternatively be formed by direct deposition of a polysilicon layer, rather than deposition of an a-Si layer that is subsequently annealed to form polysilicon. No particular polysilicon formation process is required by the invention. But it is to be recognized that in general, polysilicon is characterized by unsatisfied bonds at grain boundaries that can absorb light in waveguide operation, resulting in waveguide absorption losses. If a-Si is deposited as a core material with a relatively high hydrogen content, and then annealed to form polysilicon, the hydrogen can satisfy dangling bonds at grain boundaries and produce a relatively lower loss polysilicon core material. Depending on the composition of the interface layer of the invention, the interface layer can be employed during the a-Si anneal step to trap the H in the a-Si and enhance the incorporation of H into the grain boundary bonds.

Whatever waveguide core material is employed, e.g., polysilicon, amorphous silicon, or single crystal Si, the interface layer of the invention can be deposited on the waveguide core in a conformal manner by, e.g., a slotted plasma antenna, sputtering deposition process, a vapor deposition process, or other suitable technique; no particular interface layer formation process is required. Nitridation or nitridation concurrent with oxidation of a polysilicon, a-Si, or single crystal Si waveguide core surface can be carried out to form a thin $Si_3N_4$ or SiON interface layer. Alternatively, the use of low pressure radical oxidation (LPRO) can be utilized to grow a high quality $SiO_2$ interface layer with growth kinetics that are independent of Si waveguide surface crystalline orientation. For adhesion reasons, for many applications it can be preferred to deposit a thin, conformal oxide layer on a polysilicon waveguide surface prior to formation of a thin, conformal $Si_3N_4$ or SiON interface layer. As with a single-material interface layer, the resulting oxide-nitride bi-material interface layer should have an approximate total thickness of tens of angstroms. In general, an interface layer thickness of between about 10 angstroms and about 1000 angstroms can be preferred for most applications.

As explained above, the interface layer can be provided on all longitudinal surfaces of the waveguide core, or can be provided on a selected one or more surfaces. For SOI-based waveguide structures, the configuration of FIG. 1A is convenient, in which the interface layer is provided on the top and side surfaces of the waveguide core. For applications in which it is preferred to provide the interface layer only on the core sidewalls as in the configuration of FIG. 1C, chemical polishing or a suitable etch process can be employed to remove interface layer material on the top core surface if the interface layer deposition process results in interface material formation on the top surface. Where desired, all longitudinal surfaces of the waveguide core can be separated from the cladding by the interface layer, as in FIG. 1B. Also as explained above, an underlying cladding layer is not required for all applications and is not required by the invention. FIGS. 1A-1C illustrate an undercladding layer 14 for clarity, but such can be omitted if not required for a given application.

The above discussion provides fabrication process details for producing waveguides employing single crystal Si as a waveguide core or employing a selected deposited material as a waveguide core. For all of the waveguide material configurations described above, the core/cladding interface layer of the invention of FIGS. 1A-1C can be employed to provide a wide range of functionalities in the fabrication and performance of the waveguide.

Several aspects of the waveguide fabrication sequence in general can be considered that directly impact the performance of the resulting waveguide and which are addressed by the interface layer of the invention. For example, the high confinement of light in a single-mode, HIC waveguide leads to extreme sensitivity to dimensional variations and surface roughness at interfaces that are formed by waveguide fabrication processes. Furthermore, several of the waveguide processing steps are pushed to their current technological limits to achieve nanoscale waveguide dimensions, or are adapted from other applications, and thus can pose problems in the realization of a given waveguide design. In particular, waveguide core etch profile, lithographic resolution, and core-cladding interface smoothness are the major challenges in HIC waveguide fabrication and are all well-addressed by the interface layer of the invention.

Considering first the waveguide core etch profile, any waveguide fabrication process that involves etch of a waveguide core material, e.g., the plasma etch processes described above, produces an etch profile on the waveguide core sidewalls. A straight etch profile, i.e., straight waveguide core sidewalls, is preferred in that deviations in waveguide core sidewall etch angle can result in altered group velocity, transmission loss, bend loss, and perhaps most importantly, polarization coupling. Slanted core sidewalls can break symmetry in the mode shape and lead to coupling between the TE and TM modes within and between waveguides.

A non-ideal, slanted waveguide core etch profile is typical of photoresist mask erosion during a core etch process in which the etch selectivity between the waveguide core material and photoresist is not total. The use of a hard-mask or high-selectivity etch chemistry, such as the plasma etch chemistry described above, can remedy this situation. In contrast, an inverted waveguide core etch profile is typical of excessive waveguide core etch time. In this scenario, the waveguide core material etch does not etch the undercladding layer and by exceeding the needed etch time, the waveguide core etch attacks the bottom portions of the waveguide core sidewalls, as this region has the least amount of protective polymerization on the core sidewall.

An inverted waveguide core etch profile can also result in other fabrication complications, particularly voids between the core material and the cladding material. The voids are believed to be a result of rapid cladding deposition in combination with a shadowing effect from the inverted etch profile. In terms of waveguide transmission loss, the voids are disastrous, as they presumably vary in size and shape in the propagation direction of the waveguide and scatter light.

Considering the impact of lithography on the waveguide structure, the lithographic resolution needed to accurately produce nanoscale HIC waveguide devices is astonishingly many times smaller than the wavelength of light, $\lambda_{signal}$, that the waveguides are designed to support. To first order, waveguide dimensions scale with the index of refraction of the waveguide core material, $n_{core}$, and thus HIC waveguide fabrication can require lithographic resolution that is at least a fraction of $\lambda_{signal}/n_{core}$. As an example, Si waveguides designed for single-mode operation with 1.55 µm light have a cross-section of roughly 200×500 nm². However, for more complex HIC devices such as waveguide ring resonators and multimode interferometers, even smaller device feature sizes can be employed, requiring lithographic resolution as low as tens of nanometers. To accommodate these needs, deep ultra violet (deep-UV) or electron beam (e-beam) lithography can be preferred in fabrication of optimized HIC waveguide circuits.

While e-beam lithography offers more or less the best possible lithographic resolution, e-beam processing is not well suited for manufacturing purposes as it is a time-consuming, serial-processing method. Notwithstanding this constraint, e-beam lithography is an excellent research tool for fabricating individual devices and small circuits with the added cost bonus of not requiring a photolithography mask. Despite these research benefits, alternative photolithographic methods that lend themselves to low cost, high volume manufacturing can be preferred over e-beam lithography for many applications. Ironically, this approach is more expensive, but more in line with the fabrication issues that can arise with large scale fabrication of integrated HIC photonic circuits.

Light is debatably the most accurate measuring tool that we possess. By the same token, the small-scale dimensional variations, herein defined as roughness, that occur as a consequence of imperfect pattern transfer from a photolithography mask to a waveguide core material affect the transmission of light through the waveguide In thin film processing to deposit a waveguide core material, the top and bottom surfaces of a waveguide core tend to be smooth, whereas the waveguide core sidewalls tend to exhibit roughness that arises from, e.g., the core material etch process. In addition, the sidewall surfaces of a waveguide core should be parallel, but may not be due to proximity effects that occur in the photolithography exposure step and the etch step.

During a waveguide fabrication sequence, it can be useful to inspect the sidewall roughness of the waveguide core prior to the top cladding deposition; inspection can be carried out by a suitable metrology system, e.g., an Applied Materials NanoSEM 3D metrology system. Such a tool enables the user to view and measure both the top and sides of etched features, enabling characterization of waveguide core sidewall roughness and spectral density. It can be preferred for many applications to measure the line edge roughness (LER) with nm-scale accuracy to yield the amplitude of the roughness. Because three standard deviations, 3σ, of a distribution is approximately 99%, the RMS roughness can then be given as:

$$\sigma = \frac{LER}{3} \qquad (3)$$

One metric of single-mode, HIC channel waveguide performance is the transmission loss of the waveguide. In general, waveguide transmission loss is caused by one or more of the following: light scattering, optical absorption, and coupling to radiation or other guided modes. Some losses are inherent to fabrication or waveguide material properties, like the waveguide core doping consideration discussed above, whereas other losses can be attributed to waveguide design.

Figure 4:
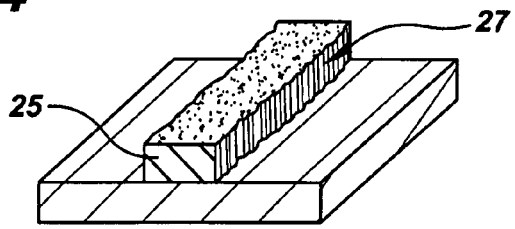
FIG. 4 is a schematic view of a channel waveguide core displaying sidewall roughness.

The dominant transmission loss mechanism for high index contrast waveguides is typically light scattering from a rough core/cladding interface. FIG. 4 is a schematic representation of a waveguide core 25 having roughened longitudinal sidewalls 27. This roughness is usually confined to the waveguide sidewalls or dominated by the roughness at the sidewalls, as shown in the figure. This sidewall roughness can be a consequence of the etching of the waveguide core structure, as described above, wherein the roughness appears as vertical striations and can be characterized as a one dimensional roughness, f(z), along the waveguide axis.

Waveguide sidewall roughness thus can be given as a random fluctuation in the waveguide width that can be characterized by an amplitude and a distribution of spatial frequency components. It is mathematically convenient in roughness scattering analysis to define the waveguide width such that the roughness distribution has zero-mean as:

$$\int_{-\infty}^{\infty} f(z)\,dz = 0 \qquad (4)$$

The roughness amplitude can be characterized by σ, the standard or root-mean-squared deviation of f(z) from the waveguide width, w. Roughness measurement by SEM or AFM will result in a discrete distribution, and in such a case, σ can then be characterized by:

$$\sigma = \sqrt{\frac{1}{N-1}\sum_{i=1}^{N}(y_i - \bar{y})^2} \qquad (5)$$

where N is the number of measurements, $y_i$ is the value of f(z) for each measurement, and $\bar{y}$ is the average value of $y_i$ over N.

The degree of periodicity in a given roughness can be characterized by the autocorrelation function, R(u), as:

$$R(u) \equiv \langle f(z)f(z+u)\rangle = \lim_{T\to\infty}\left[\frac{1}{2T}\int_{-T}^{T} f(z)f(z+u)\,dz\right] \qquad (6)$$

The autocorrelation function is a way of measuring the amount of similarity a function has to itself when displaced by u. If f(z)=sin(z), then R(u) would have maxima when u=2 mπ and minima when u=(2 m+1)π, where m is an integer. For random distributions, R(u) is typically a smooth function with a single peak, such as a Gaussian distribution.

The distribution of spatial frequency components can be obtained from the power spectral density (PSD) function of the roughness. The PSD is given by $\tilde{R}(\xi)$; the Fourier transform of R(u), the autocorrelation function, as:

$$\tilde{R}(\xi) = \int_{-\infty}^{+\infty} R(u) e^{i\xi u} du \quad (7)$$

The PSD can be viewed as the amount of each spatial frequency component, $\xi$ contained within f(z). For the example of f(z)=sin(z), $\tilde{R}(\xi)$ has a single value that corresponds to the spatial frequency $2\pi/z$.

Direct measurement of waveguide core sidewall roughness to find f(z) can be experimentally difficult. The sidewall roughness for silicon waveguide cores can be estimated by measuring the line edge roughness (LER) of the waveguide core photolithography mask with an AFM. Practically, the large step height and steep angle of ideally-etched waveguide cores all but prevents AFM measurement of actual waveguide core sidewalls. This difficulty can be overcome by cleaving a waveguide substrate next to the etched core surface to enable access to the edges of a waveguide core. Further, TEM can be employed to examine the LER of Si—SiO$_2$ waveguides and SEM can be employed to measure the LER at various stages during HIC waveguide fabrication. With these techniques, it is found that the autocorrelation of the sidewall roughness of a waveguide core can be well approximated by:

$$R(u) \approx \sigma^2 e^{-\left(\frac{|u|}{L_c}\right)} \quad (8)$$

where $\sigma$ is the RMS roughness and $L_c$ is the correlation length of the roughness.

The magnitude of the roughness correlation length, $L_c$, is related to the length scale of the waveguide core sidewall roughness. For HIC waveguides, $L_c$ values are typically below about 200 nm and are most typically about 50 nm. SEM pictures that show the vertical striated waveguide core sidewall roughness with a characteristic period can be used to approximate the order of the $L_c$. Inserting expression (8) above into expression (7) above, it is found that the PSD of sidewall roughness will have a Lorentzian form with a half width of $1/L_c$ as:

$$\tilde{R}(\xi) \approx \frac{2\sigma^2 L_c}{1 + L_c^2 \xi^2} \quad (9)$$

There are several methods for identifying roughness scattering loss as a waveguide loss mechanism. If possible, it can be preferred to image etched waveguides with SEM, to determine the amplitude and, if possible, the wavelength of the sidewall roughness. It is recognized that it can be quite difficult to measure the spectral density of the roughness with sufficient accuracy, but the roughness amplitude can, in general, be well-measured by SEM techniques.

In accordance with the invention, roughness-scattering loss can then be identified by plotting transmission loss as a function of measured waveguide core geometry. By doing so, it is possible to gain insight into the magnitude of the roughness. For channel waveguides like that of FIG. 1, it is generally easiest to vary the waveguide core width, although this procedure can be readily extended to waveguides with different thicknesses. An increase in waveguide core width decreases the intensity of the E-field at the core-cladding interface, for most waveguide geometries, resulting in less radiated power and thus less transmission loss. Therefore waveguide transmission loss is inversely proprotional to waveguide core width.

Figure 5:
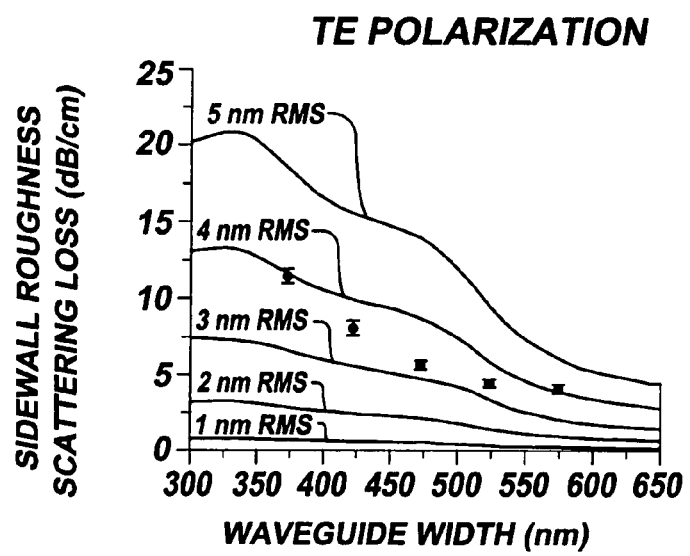
FIG. 5 is a plot of waveguide core sidewall roughness as a function of waveguide core width.

FIG. 5 is a plot of experimental Si/SiO$_2$ waveguide loss data (dots) and Barwicz-Haus sidewall roughness scattering theory predictions (lines) for different RMS roughness values. The Si waveguide core height was 200 nm, the transmission wavelength was $\lambda$=1550 nm, in the TE mode. Fitting waveguide loss versus waveguide width data to a loss theory estimate as in FIG. 5 obtains the RMS roughness of the waveguide sidewall, $\sigma$. As seen in the plot of FIG. 5, the fit between experiment and theory for waveguide loss versus width suggests a sidewall roughness of between about 3 nm and about 4 nm for the experimental data plotted here.

Figure 6A:
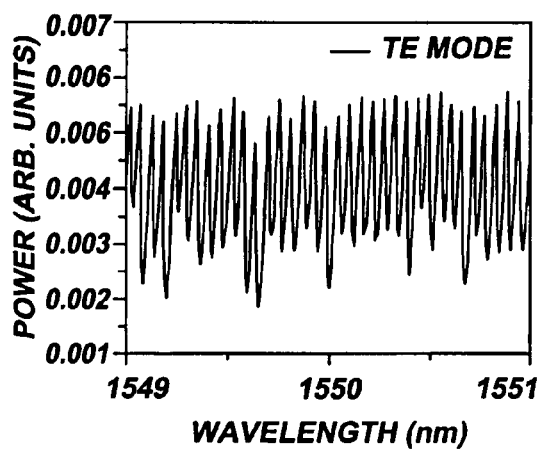
FIGS. 6A-6B are plots of power absorption as a function of wavelength for channel waveguide operation in the TE mode and the TM mode, respectively.
Figure 6B:
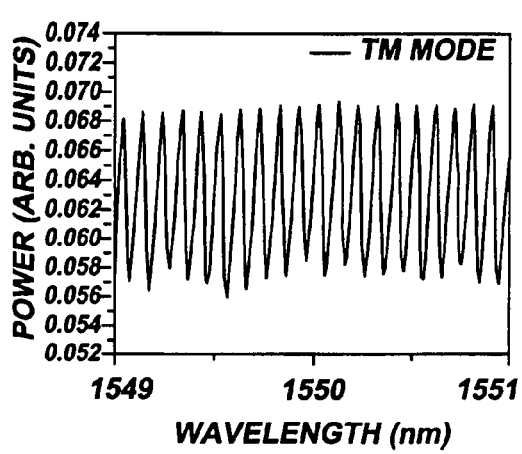

Another characteristic of roughness-scattering loss, particularly for HIC waveguides, is that some of the light can be backscattered into the waveguide core from the waveguide cladding. This effect can be seen in Fabry-Perot resonances. In the plots of FIGS. 6A-6B, the Fabry-Perot resonances from a straight, experimental Si/SiO$_2$ waveguide are plotted for the TE mode and the TM mode, respectively, with both polarizations around a transmission wavelength of $\lambda$=1550 nm. The effect of backscattering is more evident in the TE mode, which is expected given the higher roughness sensitivity, due to the higher confinement of light and thus higher integrated E-field intensity over the sidewall in the example 200×500 nm$^2$ waveguide geometry.

The oscillations in power versus wavelength of Fabry-Perot resonances are a result of reflections at the waveguide facets and correspond to the constructive and destructive interference of forward and backward propagating light in the waveguide. For straight waveguides, the power oscillates between two powers and should closely fit a sinusoidal curve. However, in practice, the Fabry-Perot resonances for high $\Delta n$ waveguides exhibit amplitude peaks that randomly vary, where the extent of variation is correlated with the scattering efficiency of the waveguide. This is seen in the plots of FIGS. 6A-6B, where the more highly confined TE mode Fabry-Perot resonances have a wider variation in peak amplitudes than the less confined and thus less efficient scattering TM mode. Explaining the power fluctuation as a result of measurement noise is dismissed given the 20 dB distance from the noise floor and the smoothness of the oscillations.

Randomly backscattered light with varying amplitude and phase is one of the few reasonable mechanisms that can explain the peak resonant power fluctuation seen in the plots of FIGS. 6A-6B. The cause of this phenomenon is a direct result of light guiding in a high $\Delta n$ waveguide with a waveguide core characterized by random sidewall roughness. The magnitude and direction of light scattered from a randomly distributed roughness is wavelength-dependent and consequently, the magnitude of the backscattered light is a similar random function of the wavelength. For backscattered light to affect the Fabry-Perot resonance output, its power must be on the same order as the reflected light from the waveguide facet. As much as 3% of guided power has been measured as backscattered light from a 220×500 nm$^2$, TE polarized, Si channel waveguide. This finding is a validation of this argument as it provides evidence that the magnitude of the backscattered light is indeed a non-negligible contributor to Fabry-Perot resonance. In comparison, the amount of guided light reflected at the waveguide facet, as calculated with 3D FDTD, is about 30%. Thus, the varying peak amplitude of Fabry-Perot resonances in high $\Delta n$ waveguides is a consequence and an indication of roughness scattering.

The dominant mechanism for transmission loss, $a_T$, of an integrated waveguide are roughness scattering at the top and sidewall interfaces, material absorption, and substrate coupling, and can be represented by:

$$a_T = a_{sidewall\ roughness} + a_{top\ roughness} + a_{absorption} + a_{substrate\ leakage} \quad (10)$$

If the analysis is restricted to a single set of waveguide materials and dimensions, it can be shown that:

$$a_T = f(\sigma_{Side}^2) + f(\sigma_{Top}^2) + f(a_{bulk}^{core}) + f(t_{underclad}) \quad (11)$$

where $\sigma_i^2$ is the RMS roughness squared for interface i, $a_{bulk}^i$ is the bulk loss of material i, and $t_{underclad}$ is the undercladding thickness. However, for Si waveguides fabricated on SOI substrates, the top waveguide core layer surface is provided in the SOI configuration as a smooth surface, virtually eliminating top surface contributions to roughness scattering. In addition, if care is taken to ensure that the silicon doping is sufficiently low and the undercladding layer is suitably thick to have negligible effects on the loss, the dominant loss mechanism for crystalline silicon waveguides fabricated on a SOI platform is sidewall roughness, thus:

$$a_T = f(\sigma_{Side}^2) \quad (12)$$

In accordance with the invention, crystalline Si waveguide sidewall roughness can be reduced with post-waveguide-core-etch smoothing methods that are carried out on a waveguide structure in which the interface layer of the invention is disposed over the sidewalls of the crystalline Si waveguide core. Oxidation smoothing is one such post-etch process which successfully reduces the loss in crystalline Si waveguides in accordance with the invention.

There are two kinetic regimes that characterize the oxidation of silicon, namely, a reaction-limited oxidation regime and a diffusion-limited oxidation regime. Oxidation of a bare silicon surface is initially reaction-limited. Here the oxidation rate is linear with time and governed by the rate at which the oxidation reactant reaches the surface, thus the term reaction-limited regime. However, as the oxidation continues, the oxide layer grows thicker, requiring the oxidizing species to diffuse through the oxide layer in order for oxidation at the silicon surface to proceed. This condition characterizes the diffusion-limited regime and results in a retardation of the oxidation rate, which is in this regime proportional to the square root of time. The transition from reaction-limited oxidation to diffusion-limited oxidation occurs when the oxide layer reaches a thickness such that the diffusion rate through the oxide layer is less than the reaction rate at the silicon interface. The thickness of the oxide layer that is characteristic of the kinetics regime transition is dependent on the diffusivity of the oxidizing species through the oxide and the temperature; typically this thickness can vary from several nm to hundreds of nm.

The kinetics of oxidation smoothing are dependent on the oxidation kinetics regime. In the reaction-limited regime, oxidation smoothing is thermodynamically driven, as explained by the Gibbs-Thompson relation as:

$$\mu(\kappa) = \mu(\infty) + \gamma \Omega \kappa \quad (13)$$

where $\mu(\kappa)$ is the chemical potential at a surface of curvature $\kappa$, $\mu(\infty)$ is the chemical potential at a flat surface, $\gamma$ is the surface energy, and $\Omega$ is the atomic volume. The Gibbs-Thompson relation signifies that the chemical potential of a surface is dependent on the curvature of the surface. Essentially, the peaks of a rough surface (positive curvature) have a higher chemical potential or reactivity than the troughs of the roughness (negative curvature). For the case of oxidizing a rough Si surface, the Gibbs-Thompson relation implies a differential reaction rate occurring on a rough surface, that results in roughness amplitude reduction, i.e., smoothing, of the surface during the course of oxidation.

Diffusion-limited oxidation smoothing is a flux driven process. Rather than depending on the surface potential, the oxidation rate is dependent on the diffusion rate of oxidizing species. As the oxide layer thickness grows, the rate of incoming oxidizing species is distributed in a uniform front parallel to the oxide-ambient interface. It is understood in accordance with the invention that as a result, in the diffusion-limited regime, the incoming oxidizing species smoothes roughness because diffusion of an oxidizing species to a roughness peak is more probable than to a roughness trough, i.e., the oxide thickness is thinner, and thus the diffusion path is shorter, at the roughness peaks. In a sense, diffusion-limited oxidation is a smoothing process that is reaction rate-independent.

Based on this recognition, in accordance with the invention, oxidation smoothing can be carried out on silicon waveguide core structures by, e.g., dry oxidation, wet oxidation, or other suitable technique, and as explained below, dry oxidation can particularly benefit from the interface layer of the invention. In this scenario, the interface layer of the invention provides an initial barrier layer on the silicon surface for enforcing the diffusion limited oxidation and in turn for smoothing the waveguide core sidewalls. Given an interface layer that is sufficiently thin, oxidizing species can diffuse through the interface layer in the manner of a semi-permeable membrane. Further, depending on the interface layer composition, the interface layer may itself oxidize and transform into an oxide that also acts to enforce diffusion-limited oxidation.

Dry oxidation can be carried out in a dry $O_2$ atmosphere at, e.g., a temperature of about 1050° C. The high surface energy of the rough waveguide core silicon sidewall surfaces is lowered by the oxidation as the crests of the roughness are oxidized fastest. The overall result is a smoothing effect as the oxidation of the Si surface occurs. The extent to which the roughness is reduced during such a dry oxidation process is a direct consequence of the oxidation kinetics. At the beginning of the oxidation, when the kinetics are reaction-limited, the roughness is smoothed fastest and at a linear rate. However, once the oxide thickness builds and the oxidation kinetics enters the diffusion-limited regime, the smoothing rate decreases and takes on a parabolic dependence with time.

In accordance with the invention, if desired, an oxidation smoothing process can be carried out on a silicon waveguide core before deposition of the interface layer of the invention. For example, if a selected interface layer material does not enable diffusion of a selected oxidizing species through the interface layer to the underlying silicon, then the silicon can first be smoothed and then the interface layer deposited on the smoothed core surfaces.

In this scenario, and recognizing that the smoothing rate is fastest in the reaction-limited regime, a multiple oxidation smoothing method can be employed to improve the efficiency of oxidation smoothing in accordance with the invention. In this method, multiple steps of oxidation, separated by etch steps to remove the newly formed oxide after each etch step, at a point where the oxidation kinetics transitions from the reaction-limited to the diffusion-limited regime, are used to smooth the rough surface. The goal is to continuously oxidize the surface in the reaction-limited regime whereby the total oxidation time is minimized as well as the total exposure time to elevated temperatures. After such an oxidize-etch-oxidize process, the interface layer can be deposited on the waveguide core.

For many applications, thermal oxidation smoothing can be impractical due to the elevated process temperature required by the oxidation, which places a strain on the thermal budget of the process flow and limits the process flow order. Additionally, the considerable cross-sectional size and shape alteration of a waveguide core that can occur in the thermal oxidation smoothing process complicates photonic circuit design. Instead, crystalline silicon waveguides can be smoothed by wet, oxidizing chemicals, in a process here termed "wet chemical oxidation." This method allows greater control in the limiting nature of the oxidation reaction and preserves dimensional integrity of a silicon waveguide core structure. Similar in technique to the multiple oxidation smoothing method, wet chemical oxidation involves the periodic removal of oxide during the oxidation process to repeatedly oxidize a Si waveguide core in the more efficient, reaction-limited oxidation regime.

Fortunately, there are many liquid, oxidizing chemistries available, several of which are already quite common in thin film processing. In general, a low temperature wet oxidizing chemistry can react with a silicon surface and form a chemical oxide layer of several nm in thickness, at which point the reaction ends. As a low temperature process, diffusion of an oxidizing species through an existing oxide layer is substantially negligible and thus the oxidation reaction is entirely limited to the reaction-limited regime. The oxidizing chemicals that can be employed here include a range of alternatives, from purely oxidizing chemicals to those that both oxidize and etch. At issue in chemical selection is the quality of the chemical oxide at the Si interface.

In keeping with existing, standard-processing-compatible oxidizing chemistries, three candidate wet oxidizing chemistries can be preferable in accordance with the invention, namely, nitric acid, piranha etch of 1:3 $H_2O_2$ and $H_2SO_4$, and RCA cleaning chemistries. XPS studies have revealed that the distribution of interface states of a chemical oxide produced with a piranha etch chemistry are nearly identical to that found in thermal dry oxidation, while the concentration of interface states is comparatively minimized for nitric acid chemical oxides. However, the standard clean one (SC1) chemistry of DI $H_2O$, $H_2O_2$, and $NH_4OH$ in a 5:1:1 ratio heated to 80° C., is particularly attractive because it results in the continual formation and dissolving of an oxide layer; here $H_2O_2$ oxidizes while $NH_4OH$ slowly dissolves the chemical oxide, slowly consuming the Si as the oxide front propagates. For many applications, it is therefore found that a multiple RCA clean process, including SC1 and SC2, of DI $H_2O$, $H_2O_2$, and HCl in a 6:1:1 ratio heated to 80° C., can be a preferred wet oxidation technique.

Given the nature of the wet-chemistry oxidation process, in which oxide is removed as well as formed, it is required, in general, that the wet-chemistry oxidation be completed prior to deposition of an interface layer on a waveguide core structure. The wet-chemistry oxidation is further complicated by the presence of the exposed $SiO_2$ undercladding layer below a Si waveguide core. It is therefore preferred that only a dilute oxide etch be employed to prevent undercutting of the undercladding layer, otherwise a waveguide core could dislodge from the substrate. This constraint is what prevents the employment of many popular Si smoothing chemistries, as they etch $SiO_2$ as well. Dilute HF chemistries are well known to slowly etch $SiO_2$ layers with high selectivity over Si, but care should be taken to not use buffered HF solutions, as the presence of $NH_4F$ has been shown to result in anisotropic etching of Si surfaces which can induce roughness on {110} Si surfaces.

In the damascene waveguide fabrication process of the invention, the waveguide core-cladding interface can be smoothed by smoothing the sidewalls of the cladding trench 32, shown in FIG. 6B, prior to deposition of an interface layer 34 on the cladding 30, as shown in FIG. 6C. In accordance with the invention, wet etch chemistry can be employed to smooth the cladding sidewalls surfaces. For example, a dilute HF etch can be employed to smooth the sidewalls of the trench in the cladding layer. Given that the interface layer deposits in a conformal manner, the smoothness of the sidewalls is then transferred to the sidewalls of the waveguide core.

For crystalline silicon waveguide core structures, there are two other post core-etch process techniques can be employed in accordance with the invention to smooth the sidewalls: anisotropic etch smoothing and hydrogen ambient-induced surface diffusion smoothing. Anisotropic etch smoothing of silicon waveguide cores can be carried out by employing, e.g., TMAH to preferentially etch the waveguide sidewalls to expose the slow etching {111} crystallographic planes. Anisotropic etching is extremely attractive as it is possible to reduce sidewall roughness to atomic level smoothness approaching ~1 Å. In addition, the process is fast and requires virtually no heat, which is advantageous for applications in which the device structure is characterized by a rigid thermal budget.

However, there are several detriments to choosing this smoothing technique. First, the exposure of {111} planes is very limiting to design. Waveguides fabricated from the prevalent {100}-oriented SOI wafers result in a trapezoidal waveguide geometry. Trapezoidal waveguide geometries are susceptible to mode-to-mode coupling. Second, the application of an anisotropic etch to a photonic circuit results in faceting of waveguide bends and ring resonators, or any waveguide structure that is not conformal to a rectilinear <110> grid, which can deleteriously affect optical transmission.

A further Si surface smoothing method in accordance with the invention is annealing in a hydrogen-ambient environment. At elevated temperatures, e.g., a temperature of T~1000° C., hydrogen induces Si surface diffusion, which smoothes rough surfaces. It has been shown that the RMS roughness of etched Si trench sidewalls can be decreased from, e.g., 1.72 nm to 0.11 nm by this technique, as measured by AFM. This hydrogen-ambient annealing process can be carried out prior to formation of an interface layer on the waveguide core, or subsequent to formation of an interface layer on a waveguide core for configurations in which the interface layer accommodates diffusion of hydrogen through the interface layer.

While the effectiveness of hydrogen annealing on Si surface smoothing is very attractive, the process is not easily adapted to integrated photonic circuits. As with the oxidation smoothing processes described above, the hydrogen annealing process temperature can be too high for the thermal budget of some applications. In addition, the induced surface diffusion can result in a rounding of the geometric features. This is problematic for photonic devices, which depend on evanescent coupling, as the altered waveguide cross-section alters the evanescent field overlap, which governs the coupling characteristics and device operation. However, unlike ambient oxidation smoothing, Si consumption is here negligible.

Thus for many applications, oxidation smoothing in the diffusion limited regime can be preferred for smoothing a silicon waveguide core. In this scenario, the interface layer of the invention is particularly advantageous for enforcing the diffusion limited oxidation and in turn for smoothing the core interface. Reaction limited smoothing, such as by the multiple oxidation method discussed above, is understood to be more efficient in terms of smoothing roughness to Si consumption, but is known to roughen the Si surface by several angstroms. In contrast, diffusion limited oxidation smoothing of single crystalline Si through an oxidation barrier provided by the interface layer of the invention can smooth roughnesses of this amplitude. The interface layer of the invention therefore can be exploited to enable effective oxidation smoothing of waveguide core structures produced with an SOI substrate configuration or other crystalline silicon configuration.

As explained previously, in a further embodiment of the invention, the interface layer is employed for reducing surface roughness and the corresponding transmission loss due to roughness scattering. For roughness-limited waveguides, the addition of an interface layer with an index of refraction that is between that of the core and cladding materials can act as a desensitizer to scattering-roughness loss. For an a-Si (n=3.5) waveguide core clad with $SiO_2$ (n=1.45), SiN (n=2.0-2.2) is a well-suited interface material given its index, CMOS compatibility, and optical transparency at the telecom wavelengths, assuming a sufficiently low H content.

The sensitivity of roughness-scattering in channel waveguides scales non-linearly with the index difference, $\Delta n$, between the core and cladding materials. For a $SiON/SiO_2$ ($\Delta n=0.5$) waveguide, the scattering loss sensitivity for single-mode geometries is of order $10^{-4}$ dB/cm-nm$^2$, whereas for a $Si/SiO_2$ ($\Delta n=2.0$) waveguide it is of order $10^{-1}$ dB/cm-nm$^2$. By inserting an interface layer material of intermediate index, the interface layer reduces the roughness-scattering for a given sidewall or top surface roughness. Even though the addition of the interface layer adds another set of dielectric interfaces, the scattering from two low $\Delta n$ interfaces is less than one high $\Delta n$ interface, as a result of the hyper-linear scaling. This can be expressed as a relation where:

$$a_{Si \to SiO_2}^{scattering} > a_{Si \to SiN}^{scattering} + a_{SiN \to SiO_2}^{scattering} \quad (14)$$

The invention therefore provides a discovery that an intermediate-index interface layer can be employed to lower roughness-scattering loss, assuming that the roughness is similar in the two layers.

EXAMPLE 1

SOI waveguides were fabricated in the manner described above, with a 200 nm-thick SOI silicon layer and 3 μm-thick buried oxide layer. Deep-UV photolithography was employed to expose the waveguide core mask. Etching of the Si waveguide core was carried out with an Applied Materials DPS poly etch chamber with an $HBr/Cl_2/HeO_2/CF_4$ chemistry. The photoresist was removed with an oxygen plasma ash step. For a number of samples, a 10 nm-thick conformal SiN layer was deposited in the manner described above on the etched Si waveguide core before the top cladding deposition. For all samples, a 3 μm-thick top cladding layer was deposited by high density plasma enhanced chemical vapor deposition from $SiH_4$ and $O_2$ precursors.

Figure 7:
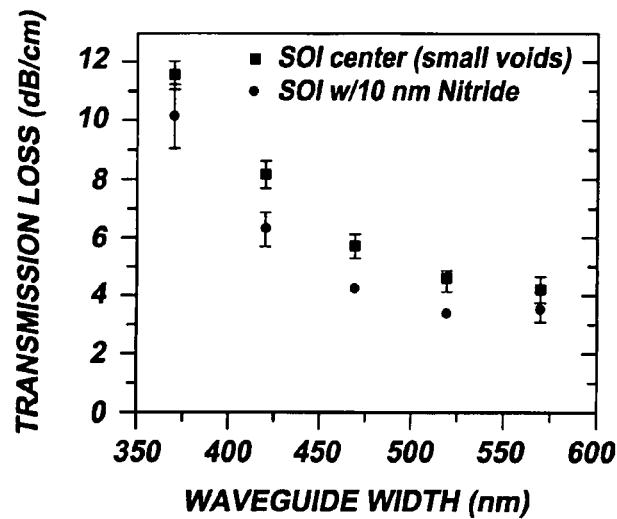
FIG. 7 is a plot of transmission loss as a function of waveguide core width for a SOI channel waveguide in accordance with the invention.

A comparison of average transmission loss data for SOI-based $Si/SiO_2$ waveguides with and without the SiN upper interface layer is plotted in FIG. 7, with the plot showing average waveguide transmission loss for TE polarized light having a wavelength of 1550 nm. The waveguide including an interface layer clearly achieved a reduction in loss of about 1.0-1.5 dB/cm for all waveguide geometries. This corresponds to an estimated effective RMS roughness reduction of about 0.5 nm. However, attributing the loss reduction solely to the interface layer roughness-desensitization effect is not clear. The addition of the SiN layer may serve to fill in the waveguide sidewall recess that occurred in the etch process and thereby prevent the formation of the voids during the top cladding deposition step. In either case, the interface layer was quantitatively shown to reduce waveguide loss.

Now turning to a further embodiment of the invention, the core/cladding interface layer can be employed for enabling an oxidation smoothing technique on a granular core material such as polysilicon. Unlike single crystal silicon waveguide core structures, polysilicon waveguide core structures are not well addressed by the oxidation processes of the invention described above to smooth the core surfaces, due to the anisotropic oxidizing nature of randomly oriented grains on the surface, as well as intergranular diffusion. Conventional oxidation processes can actually serve to roughen a polysilicon waveguide core surface, especially in the reaction-limited oxidation regime. Reaction-limited oxidation is thermodynamically driven, such that the higher surface energy of the roughness peaks leads to preferential oxidation and thus smoothing of those peaks. For polysilicon, reaction-limited oxidation occurs at different rates on a given surface for grains with different crystallographic orientations. Additionally, grain boundaries provide a pathway for oxidizing species to quickly diffuse and oxidize at a faster rate. This phenomenon is termed grain-boundary grooving.

As a result, conventional oxidation processes do not lend themselves to sidewall smoothing of deposited waveguide core materials such as polysilicon. In accordance with the invention, the core/cladding interface layer of the invention can be provided in a waveguide structure having a polysilicon waveguide core to enable sidewall smoothing of the polysilicon core by a diffusion-limited oxidation step.

As explained above, diffusion-limited oxidation is a flux driven process. Rather than depending on the surface potential, a diffusion-limited flux rate distributes the rate of incoming oxidizing species as a uniform front parallel to the waveguide-ambient interface. The uniformly distributed front of incoming oxidizing species smoothes roughness because diffusion of an oxidizing species to a roughness peak is more probable than to a roughness trough, i.e., the diffusion length is shorter to a roughness peak than a roughness trough. As a result of this flux behavior, diffusion-limited oxidation is a smoothing process that is reaction rate-independent, and thus in accordance with the invention provides a particularly well-suited process for smoothing polycrystalline waveguide materials.

With the interface layer of the invention in place during polysilicon oxidation, the interface layer provides an initial barrier layer on the core surface for enforcing the diffusion limited oxidation and in turn for smoothing the waveguide core sidewalls. Depending on the interface layer composition, the interface layer may itself oxidize and transform into an oxide that also acts to enforce diffusion-limited oxidation. It is preferred for this application that the interface layer be conformal and uniform so that equivalent oxidation fluxes are provided to the polysilicon waveguide core sidewall and top surface interfaces, enabling waveguide shape preservation during the smoothing process. Example interface layer materials that facilitate diffusion-limited oxidation of a polysilicon waveguide core include $Si_3N_4$, SiON, and $SiO_2$.

Whatever interface layer material is selected, when employed for polysilicon oxidation, the interface layer should have a thickness that is inversely proportional to the diffusion coefficient of the oxidizing species through the interface layer. For the above mentioned materials these thicknesses are on the order of tens of angstroms to ensure a reasonable flux of oxidizing species to the waveguide core surface. Like any diffusion process, the extent of the diffusion front is approximately given by the diffusion distance, x, where D is the diffusion constant and t is time, as:

$$x \approx \sqrt{Dt}$$

Thus, the same amount of oxidation diffusion can occur by using a thicker interface layer for a given process time or an interface layer with a given thickness for a longer process time.

In accordance with the invention, with an interface layer in place over a polysilicon waveguide core, a dry oxidation step can be carried out prior to deposition of the upper cladding material to smooth the polysilicon in the manner described above for smoothing single crystalline silicon. In one example process, a 30 angstrom-thick $Si_3N_4$ conformal interface layer is formed on a polysilicon waveguide core and then 15 minutes of conventional wet oxidation at 900° C. is carried out to oxidize the polysilicon in the diffusion-limited regime and smooth the sidewalls of the waveguide core structure. Oxidation species can include $O_2$, $H_2O$, and $O_3$, which can be used in combination with each other or other gases. Alternatively, an oxide interface layer can be employed with the polysilicon core material for aiding smoothing of the polysilicon material. This is an example in accordance with the invention in which the interface material and the cladding material can be similar or substantially identical but are formed in distinct deposition processes during separate fabrication process steps.

A particular advantage of use of the interface layer of the invention for oxidation of a polysilicon waveguide core is the ability of the interface layer to preserve the waveguide core shape as it is oxidizes; this is not the case for traditional oxidation smoothing methods. Use of a thin conformal interface layer also prevents extensive waveguide material consumption during roughness reduction in the oxidation reaction. A further advantage of use of the interface layer of the invention for oxidation of a polysilicon waveguide core is the ability of the interface layer to prevent grain boundary grooving of the core during the top cladding deposition process. For the case of a polycrystalline core material, the final cladding deposition step, which for the case of polysilicon can be, e.g., $SiO_2$ deposition, can further exacerbate the sidewall roughness of the waveguide by chemically reacting with the grain boundaries and inciting surface roughening.

As explained previously, the invention is not limited to the silicon-silicon dioxide materials system described above. The interface layer of the invention can be employed for smoothing in other materials systems. In general, for any selected materials system, there are two requirements of the interface layer for enabling smoothing. First, the interface layer material must enable diffusion of a chemical reactant through the interface layer to the underlying core material, and should limit the chemical reactant, e.g., the oxidant, to a diffusion-limited, e.g., flux-limited process regime. Second, the interface layer material is preferably conformal and should not react with the waveguide core surface during the oxidation process.

Turning now to other applications of the interface layer of the invention, the interface layer can be employed to reduce the electric field intensity at the rough sidewall interface of a waveguide core and cladding. In this application, the longitudinal side surfaces of the waveguide core are relatively more critical than the top and bottom surfaces of the core. This is particularly true for a TE-polarized high Δn waveguide, which is characterized by a relatively higher field strength at the potentially rough sidewalls. Thus, for this application, the interface layer of the invention is required only at the longitudinal sidewalls and not at the waveguide core top and bottom surfaces, and the configuration of FIG. 1C is here applicable.

Further in accordance with the invention, the interface layer can be employed as a structure-maintaining form for retaining the shape of the waveguide core material as the core material is subjected to, e.g., a reflow process to reduce core sidewall roughness. For example, given a core material that is a chalcogenide glass, such as $As_2Se_3$, it is possible to anneal the waveguide structure above the glass transition temperature, $T_g$, of the core material to induce surface reflow of only the core material. In this application, the interface layer is selected to be characterized by a glass transition temperature that is higher than that of the waveguide core material. With this condition met, the interface layer does not reflow and operates as a stabilizing enclosure of the core region that maintains the core region geometry during the reflow process. With this stabilization condition, the interface layer preserves the waveguide cross-sectional geometry and dimensions during a reflow process while reducing waveguide transmission loss by smoothing of the core during the reflow process. In addition, the interface layer maintains the composition of the core even when the core material includes a volatile component. In one example of such a process, the waveguide core material is selected as an AsGeSeTe chalcogenide glass, having a glass transition temperature, $T_g=245°$ C. Here the interface layer can be provided as, e.g., ZBLAN, which is a mixture of zirconium, barium, lanthanum, aluminum, and sodium fluoride, and which is characterized by a glass transition temperature, $T_g=265°$ C. Heating of this structure for several minutes at a temperature of, e.g., about 255° C. can cause the chalcogenide glass to flow while preserving the interface layer as a confining structure.

In an alternative technique provided by the invention, a waveguide core geometry can be tailored to a selected rounded shape with an interface layer having a selected viscosity and with a corresponding annealing schedule. Further, the interface layer material can be selected as a material having a higher viscosity than that of the waveguide core material. In this scenario, during a core reflow process, the interface layer can undergo short range transport processes, but not undergo flow in the manner of the core material. The interface material here operates as an encapsulating layer. This condition enhances smoothing of the core roughness as the interface layer undergoes a transport process.

The interface layer of the invention can further be exploited as a capping layer during a waveguide core annealing step. For example, as explained previously, a SiN interface layer can be employed when annealing an a-Si waveguide core to produce a polysilicon waveguide core. Here, annealing, e.g., at 650° C. for about 10 minutes, in a $N_2$ ambient can be employed to crystallize the a-Si while trapping hydrogen in the silicon for reacting with dangling bonds at polysilicon grain boundaries. As explained above, hydrogen doping of a silicon layer can be desirable because it is understood that the presence of H in the Si can reduce the density of unpassivated dangling bonds at grain boundaries, which is a source of absorption loss, and can also serve as a mechanism to reduce grain boundary diffusion of oxygen during an oxidation smoothing step. Thus H-incorporation in polysilicon, a-Si, and single crystal Si can enhance the smoothing effects of this invention. The doping can easily be achieved by adjusting the processing parameters of most deposition systems that use $SiH_4$ as a precursor for Si deposition, e.g., by CVD, or simply by introducing $H_2$ gas into the deposition chamber for sputtering. In accordance with the invention, the thickness and composition of the interface layer is here selected to substantially prohibit out-diffusion of a selected one or more species from a waveguide core structure once the waveguide core is formed.

Further, in general for any annealing process, the interface layer protects the core material, e.g., during its transformation to crystalline material, from contaminants, such as ambient gases, which could react with the surface of the core and incite grain boundary grooving. It is further recognized that in accordance with the invention, a single high-temperature oxidation/annealing step can be employed to simultaneously convert an amorphous-Si waveguide core to a polysilicon waveguide core while smoothing the surfaces of the core. A two-step process including a first $N_2$ anneal step followed by an oxidation smoothing step can also be employed. If smoothing is not desired, the re-crystallization annealing step can be carried out alone.

EXAMPLE 2

Waveguides employing amorphous silicon as a waveguide core material were fabricated in the following manner. A 3 μm-thick HDP-PECVD $SiO_2$ film was deposited on a (100) Si substrate to form an undercladding layer. A thin (10 or 25 nm) PECVD SiN interface layer was subsequently deposited, here to function not only as an interface layer but also to act as an etch stop. Next, a PECVD a-Si waveguide core layer was deposited with one of three deposition powers (P1<P2<P3). By varying the deposition power, the kinetic energy used in the dissociation of the $SiH_4$ precursor was altered and the H-content in the a-Si films was varied. A CMP step was used to remove any top surface roughness that may have been present, leaving a 200 nm-thick a-Si film. Deep TV photolithography at a wavelength, $\lambda=248$ nm, and dry etching steps were used to define the single-mode channel waveguides. Post-etch, the resist was removed and another thin, conformal PECVD SiN layer, of 10 nm or 25 nm, was deposited to form an interface layer that operated as a hydrogen diffusion barrier interface layer. Finally, a 3 μm layer of HDP-PECVD $SiO_2$ was deposited as a top cladding layer.

Figure 8A:
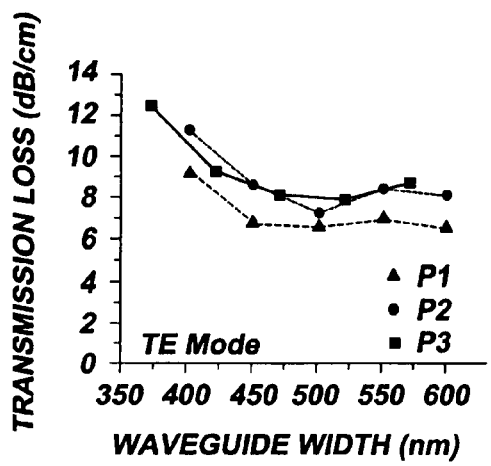
FIGS. 8A-8B are plots of transmission loss as a function of waveguide core width for the TE mode and the TM mode, respectively.
Figure 8B:
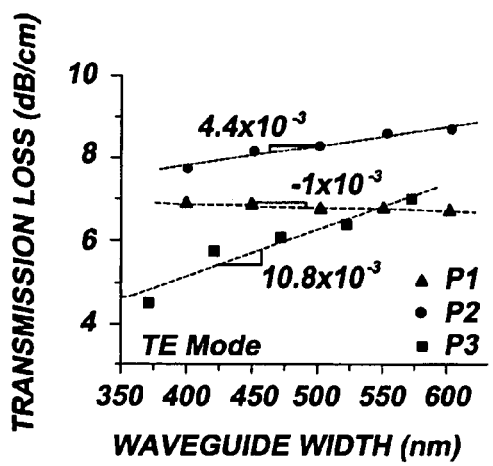

FIGS. 8A-8B are plots of waveguide loss results for the fabricated waveguides obtained by the paperclip cutback method using a Newport Auto-align station in combination with a JDSU SWS Laser. The fitting error was less than 0.5 dB/cm. Each data point is an average of several cutback loss measurements from several waveguide chips. For the TE mode plot, the line connecting the points is merely to guide the eye. For the TM mode plot, each deposition power data set is fit to a line; the slope of this data is useful in estimating the bulk loss of the waveguide core material. The measured data was produced for a wavelength of $\lambda=1550$ nm as a function of width for 200 nm height waveguide cores. The P1 and P2 waveguide samples were provided with a 25 nm-thick SiN interface layer, while the P3 sample was provided with a 10 nm-thick SiN interface layer.

Although the SiN layer added transmission loss, obtaining the bulk loss of the a-Si materials was still possible by measuring the slope of the transmission loss versus waveguide width. Assuming that the loss is truly absorption-dominated, as it is for the TM mode data, in which the field intensity at the sidewall does not significantly contribute to scattering loss, due to weak confinement within these waveguide geometries, and is virtually constant with waveguide width, it was possible to estimate the bulk loss with the expressions given above. Both $\partial\alpha/\partial w$ and $\partial\Gamma/\partial w$ were well approximated by a linear function for the waveguide geometries used in this experimental example. In addition, the presence of the thin SiN layer did not appreciably affect the values of $\partial\alpha/\partial w$ and $\partial\Gamma/\partial w$.

$$\alpha_{bulk}^{a\text{-}Si} = \left(\frac{\partial \alpha}{\partial w}\right)\left(\frac{\partial \Gamma}{\partial w}\right)^{-1} \tag{16}$$

As observed in Table I below, a reduction in the PECVD deposition power resulted in a reduction of the a-Si bulk loss. It is understood that by lowering the deposition power, the kinetic energy used in the dissociation of the $SiH_4$ precursor is reduced, which increases the H-content in the a-Si films. The increased H-content passivates the dangling bond defects responsible for absorption. Interestingly, the bulk loss for the P1 a-Si material was extremely low, as observed by its very small slope. This low level of bulk loss (<1 dB/cm) is well suited for integrated electronic-photonic chip applications. The fact that $\partial\alpha/\partial w$ was negative for this waveguide structure may be a result of the power distribution in the 25 nm thick SiN, which has a slightly negative slope with waveguide width.

TABLE I

| Deposition Power (P1 < P2 < P3) | SiN Thickness [nm] | dΓ/dw [nm$^{-1}$] | dα/dw [dB/(cm-nm)] | Estimated a-Si Bulk Loss [dB/cm] |
|---|---|---|---|---|
| P1 | 25 | 7.0 × 10$^{-4}$ | −1 × 10$^{-3}$ | ~0 ± 1 |
| P2 | 25 | 7.0 × 10$^{-4}$ | 4.4 × 10$^{-3}$ | 6.3 ± 1 |
| P3 | 10 | 7.1 × 10$^{-4}$ | 10.8 × 10$^{-3}$ | 15.2 ± 2 |

In contrast with this example embodiment described just above, the invention alternatively contemplates adjustment of the interface layer properties to dope the interface layer with a species that will diffuse into the underlying waveguide core material for control of the core material properties. The dopant species is preferably selected to infiltrate the waveguide core material during a heat-treatment step subsequent to the core formation. For example, the high temperature oxidation smoothing and annealing processes described above can be employed for simultaneous doping of the core material by a doped interface layer. The dopant can be employed for, e.g., affecting the electrical properties of the core material. Where silicon is the core material, conventional silicon dopants such as boron, phosphorus, or other suitable dopant can be employed. The dopant can also be employed for affecting the charge carrier lifetime characteristic of the core material. Where silicon is the core material, gold or other suitable material can be employed. The dopant can further be employed for promoting smoothing at the interface surfaces of the core structure. Where silicon is the core material, hydrogen or other suitable dopant can be employed.

Turning now to other embodiments of the invention, the interface layer can be tailored with an index of refraction that can be adjusted after fabrication, thereby providing the ability to adjust the index of refraction of the waveguide system. This is useful for compensating for non-deterministic errors that can arise during fabrication of a waveguide, particularly for waveguide-based devices that are optical path length-dependent or phase-dependent in operation. By adjusting the interface layer index it is possible to "trim" the optical path length of the device and compensate for fabrication errors.

An example of such a device is a micro-ring resonator device, typically used for filtering applications, and in which slight changes in the waveguide effective index can shift the resonant wavelength by several nm. The use of an interface layer that is capable of being trimmed enables one to alter the effective index of refraction of the device post-production of the device, and thereby to compensate for the fabrication error. Another example is a directional coupler, in which the shift of the waveguide effective index of refraction alters the phase of light, which governs the amount of coupled power.

Given the use of Si as a waveguide core material, then trimming materials that are suitable as an interface layer for an Si waveguide include, e.g., polysilane polymers, having an index of refraction that can be altered by exposure with UV light, resulting in an irreversible photo-oxidation reaction; and chalcogenide glasses, having an index of refraction that can be altered by exposure to high intensity visible light and reversed by annealing. Thus, in accordance with the invention, after fabrication of a waveguide having an adjustable-index interface layer, the waveguide is processed, based on the interface layer species, to adjust the index of refraction of the interface layer based on fabrication results and/or required device performance.

In a further aspect of the invention, the interface layer can be employed to stabilize a waveguide effective index of refraction as a function of temperature. This is useful for creating temperature-insensitive waveguide-based devices that are optical path length-dependent or phase-dependent in operation. An example of such a device is a micro-ring resonator device, typically used for filtering applications, in which slight changes in temperature can alter the resonant wavelength by several nm via the thermo-optic effect. Another example is a directional coupler, in which thermal variations alter the amount of coupled power.

By properly balancing the thermo-optic coefficients with the relative optical power distribution in the core and cladding materials, such as by using a dielectric core material, such as Si, having a positive thermo-optic coefficient, and an interface layer, such as a polymer, e.g., polysilane, having a negative thermo-optic coefficient, it is possible to create temperature-insensitive waveguide devices, thereby eliminating the complications of thermal compensation. In this embodiment, to realize temperature-independent behavior of a waveguide structure, the thickness of the interface layer is preferably selected to be proportional to the ratio of thermo-optic effects and the portion of optical power in the waveguide core material and cladding material. The waveguide geometry should be designed preferably such that the fraction of power ($X_i$), and the thermo-optic coefficient ($\Phi_i$) of each waveguide layer i add up to meet the condition:

$$\sum_i \Phi_i X_i = 0 \tag{17}$$

In a further aspect of the invention, the interface layer is employed for enabling the nonlinear attenuation of the light guided by a waveguide. This embodiment is useful in preventing photodetector saturation. In this case, the interface layer is specified as a material having an absorption coefficient that is dependent on the guided light intensity. An example of such a material is InP, which has a large two-photon-absorption coefficient for $\lambda = 1550$ nm. With this interface layer material, the interface layer acts to attenuate high intensity signals without affecting the transmission of low intensity signals. The extent of this effect is proportional to the amount of power guided in the interface layer and therefore proportional to the interface layer thickness.

The interface layer of the invention can further be employed as a means of modulating a signal being guided by a waveguide. This embodiment can be useful in switching or modulator device applications. In this case, the interface layer is specified to be a nonlinear material having a refractive index that is dependent on the intensity of light that is guided by the waveguide. An example of this phenomenon is the optical Kerr effect, which occurs in many glasses, organic materials, and semiconductors.

If the waveguide structure including the interface layer is used in a resonator, directional coupler, or any optical path length-dependent or phase-dependent device configuration, the spectral behavior will be a function of the light intensity. Therefore, modulating or switching a single wavelength of light occurs when the intensity level of light is varied.

For the case of exploiting the optical Kerr effect, it can be preferred for many applications to employ as the interface layer a semiconducting material having a bandgap that is close in energy to the guided light. For example, where the wavelength of light to be guided is in the telecommunications spectrum, an interface layer formed of, e.g., InGaAsP alloys can be preferred. The extent of this effect is proportional to the amount of power guided in the interface layer and therefore proportional to the interface layer thickness.

In a further embodiment of the invention, a birefringent interface layer can be employed to compensate for polarization-dependent propagation through a waveguide. The aspect ratio and geometry of a waveguide structure can add birefringence to a waveguide. In many cases the waveguide geometry is chosen to optimize other properties, such as propagation loss, at the cost of producing birefringent propagation. However, by using an anisotropic optical material as an interface layer, e.g., an interface layer of $LiNbO_3$, $BaTiO_3$, or KDP, it is possible to compensate for the geometric birefringence with material birefringence. The extent of this effect is proportional to the amount of power guided in the inter-cladding layer and therefore proportional to the inter-cladding layer thickness. Alternatively, the use of a birefringent interface layer can be employed increase the birefringence of the waveguide. There are many applications, such as in polarization rotator structures, where this property can be useful.

With the above description, the invention is demonstrated to provide a waveguide interface layer at the interface between a waveguide core and a waveguide cladding that enables a wide range of structure geometries and performance. The waveguide interface layer can provide an intermediate index of refraction, can operate as a membrane to control kinetics of processes, such as oxidation smoothing processes, can operate to control waveguide core shape, and can operate as a cap to contain volatile constituents in a waveguide core. The interface layer can also be employed for precise tailoring of device capabilities and performance. It is recognized, of course, that those skilled in the art may make various modifications and additions to the processes of the invention without departing from the spirit and scope of the present contribution to the art. Accordingly, it is to be understood that the protection sought to be afforded hereby should be deemed to extend to the subject matter of the claims and all equivalents thereof fairly within the scope of the invention.

We claim:

1. A waveguide comprising an amorphous hydrogenated silicon waveguide core having longitudinal sidewall surfaces, a longitudinal top surface, and a longitudinal bottom surface that is disposed on a substrate;

an interface layer comprising SiN disposed on the longitudinal sidewall, bottom, and top surfaces of the waveguide core; and a waveguide cladding layer disposed on at least the waveguide core sidewall and top surfaces, over the interface layer wherein the waveguide interface layer is characterized by a thickness of between about 1 nm and about 100 nm.

2. The waveguide of claim 1 wherein the interface layer is further disposed between the longitudinal bottom surface of the waveguide core and the substrate.

3. The waveguide of claim 1 further comprising an undercladding layer disposed between the longitudinal bottom surface of the waveguide core and the substrate.

4. The waveguide of claim 1 wherein the waveguide core is characterized by a cross-sectional geometry selected from the group consisting of ridge waveguide geometry, rib waveguide geometry, channel waveguide geometry, wire waveguide geometry, and strip-loaded waveguide geometry.

5. The waveguide of claim 1 wherein the waveguide core is disposed in a trench in a layer of waveguide cladding material disposed on the substrate, with the interface layer disposed between the waveguide core and the cladding layer on the substrate.

6. The waveguide of claim 1 wherein the waveguide core and cladding comprise materials that characterize the waveguide as a waveguide selected from the group consisting of a dielectric waveguide, a high index-contrast waveguide, and a single-mode waveguide.

7. The waveguide of claim 1 wherein the interface layer is characterized by an index of refraction that is between an index of refraction characteristic of the waveguide core and an index of refraction characteristic of the waveguide cladding layer.

8. The waveguide of claim 1 wherein the waveguide cladding layer comprises an oxide.

9. The waveguide of claim 1 wherein the substrate comprises silicon.

10. A method for fabricating a waveguide comprising:
forming a waveguide undercladding layer on a substrate;
forming an amorphous hydrogenated silicon waveguide core on the undercladding layer;
forming an interface layer comprising SiN on longitudinal sidewall surfaces of the waveguide core; and
forming an upper cladding layer on a longitudinal top surface and on longitudinal sidewall surfaces of the waveguide core, over the interface layer wherein the waveguide interface layer is characterized by a thickness of between about 1 nm and about 100 nm.

11. The method of claim 10 wherein forming a waveguide undercladding layer comprises depositing, on a silicon substrate, a layer comprising oxide.

12. The method of claim 10 wherein forming a waveguide undercladding layer on a substrate, forming a waveguide core on the undercladding layer, and forming an interface layer on longitudinal sidewall surfaces of the waveguide core comprise:
depositing an undercladding layer on a substrate;
etching in the undercladding layer a trench having a geometry corresponding to the waveguide core;
depositing an interface layer in the undercladding layer trench; and
depositing a waveguide core material on the interface layer in the undercladding layer trench.

13. The method of claim 10 wherein forming an interface layer comprises forming an interface layer that is characterized by an index of refraction value that is between an index of refraction value of the waveguide core and an index of refraction value of the waveguide undercladding and upper cladding layers.

14. The method of claim 10 wherein forming an upper cladding layer comprises depositing an upper cladding layer comprising oxide.

15. The method of claim 10 wherein forming a waveguide core comprises etching a waveguide core material to form a cross-sectional waveguide geometry selected from the group consisting of ridge waveguide geometry, rib waveguide geometry, channel waveguide geometry, wire waveguide geometry, and strip-loaded waveguide geometry.

16. The method of claim 10 further comprising re-crystallizing the amorphous hydrogenated silicon waveguide core into hydrogen-doped polysilicon by subjecting the waveguide core and interface layer to a recrystallization heat treatment.

17. The method of claim 16 wherein the interface layer traps hydrogen in the amorphous silicon core during the recrystallization heat treatment.

18. A waveguide comprising:
a hydrogen-doped polysilicon waveguide core having longitudinal sidewall surfaces, a longitudinal top surface, and a longitudinal bottom surface that is disposed on a substrate;
an interface layer comprising SiN disposed on the longitudinal sidewall, bottom, and top surfaces of the waveguide core; and
a waveguide cladding layer disposed on at least the waveguide core sidewall and top surfaces, over the interface layer wherein the waveguide interface layer is characterized by a thickness of between about 1 nm and about 100 nm.

* * * * *

UNITED STATES PATENT AND TRADEMARK OFFICE
CERTIFICATE OF CORRECTION

| | | |
|---|---|---|
| PATENT NO. | : 7,831,123 B2 | Page 1 of 1 |
| APPLICATION NO. | : 11/899234 | |
| DATED | : November 9, 2010 | |
| INVENTOR(S) | : Daniel K. Sparacin | |

It is certified that error appears in the above-identified patent and that said Letters Patent is hereby corrected as shown below:

Please delete the paragraph titled 'STATEMENT REGARDING FEDERALLY SPONSORED RESEARCH' encompassing Column 1, lines 12-15:

"This invention was made with Government support under Contract No. HR0011-05-C-0027 awarded by the Defense Advanced Research Project Agency. The Government has certain rights in the invention."

and replace with:

--This invention was made with government support under Grant No. DMR0213282 awarded by the National Science Foundation. The government has certain rights in this invention.--

Signed and Sealed this
Twenty-third Day of October, 2012

David J. Kappos
*Director of the United States Patent and Trademark Office*